(12) United States Patent
Ullakko

(10) Patent No.: US 11,311,878 B2
(45) Date of Patent: Apr. 26, 2022

(54) MICROFLUIDIC DEVICE

(71) Applicant: TIKOMAT OY, Savonlinna (FI)

(72) Inventor: Kari Ullakko, Savonlinna (FI)

(73) Assignee: TIKOMAT OY, Savonlinna (FI)

(*) Notice: Subject to any disclaimer, the term of this patent is extended or adjusted under 35 U.S.C. 154(b) by 261 days.

(21) Appl. No.: 16/628,636

(22) PCT Filed: Jul. 7, 2018

(86) PCT No.: PCT/FI2018/050537
§ 371 (c)(1),
(2) Date: Jan. 3, 2020

(87) PCT Pub. No.: WO2019/008235
PCT Pub. Date: Jan. 10, 2019

(65) Prior Publication Data
US 2020/0188912 A1  Jun. 18, 2020

(30) Foreign Application Priority Data

Jul. 7, 2017 (FI) .................................... 20170102
Mar. 8, 2018 (FI) .................................... 20180036

(51) Int. Cl.
| | |
|---|---|
| *B01L 3/00* | (2006.01) |
| *F04B 43/04* | (2006.01) |
| *F04B 45/047* | (2006.01) |
| *F04B 43/14* | (2006.01) |
| *F04B 45/10* | (2006.01) |

(52) U.S. Cl.
CPC ..... *B01L 3/50273* (2013.01); *B01L 3/502738* (2013.01); *F04B 43/043* (2013.01); *F04B 45/047* (2013.01); *B01L 2200/027* (2013.01); *B01L 2200/10* (2013.01); *B01L 2300/0816* (2013.01); *B01L 2300/0887* (2013.01); *B01L 2300/123* (2013.01); *B01L 2400/0481* (2013.01); *B01L 2400/0487* (2013.01); *B01L 2400/0655* (2013.01); *F04B 43/14* (2013.01); *F04B 45/10* (2013.01)

(58) Field of Classification Search
CPC ...... F04B 43/14; F04B 43/043; F04B 45/047; F04B 45/10
See application file for complete search history.

(56) References Cited

PUBLICATIONS

Smith et al., Characterization of a high-resolution solid-state micropump that can be integrated into microfluidic systems, Jan. 8, 2015, Springer-Verlag, Microfluid Nanofluid, 18: 1255-1263 (Year: 2015).*

* cited by examiner

*Primary Examiner* — Jennifer Wecker
*Assistant Examiner* — Kathryn Elizabeth Limbaugh
(74) *Attorney, Agent, or Firm* — Rimôn PC

(57) ABSTRACT

The invention relates to a microfluidic device comprising at least one element (1) of magnetic shape memory (MSM) material for handling of a fluid flow, the MSM element (1) being controlled by a magnetic field. The device comprises elastic material (2) between the handled fluid and the MSM element (1), and that the magnetic field is arranged to form a local shrinkage to the MSM element (1) which together with the elastic material (2) form a shrinkage cavity (3) in a location where the magnetic field is applied to the MSM element. Preferably, the microfluidic device is connected to a lab-on-a-chip, and it can act as one of the followings: a pump, vacuum pump, compressor, refrigerator, valve, manifold, dozer, mixer.

56 Claims, 15 Drawing Sheets

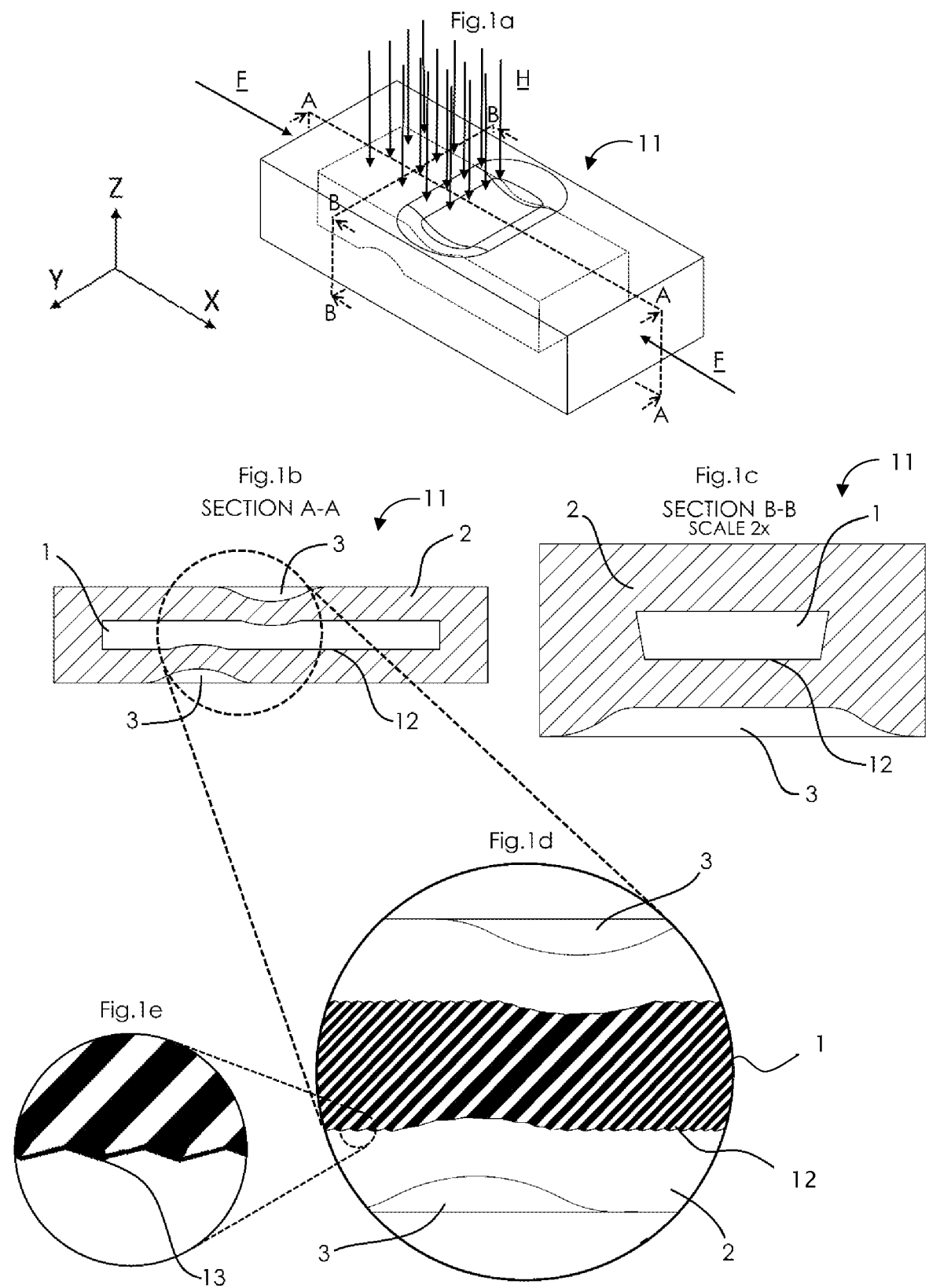

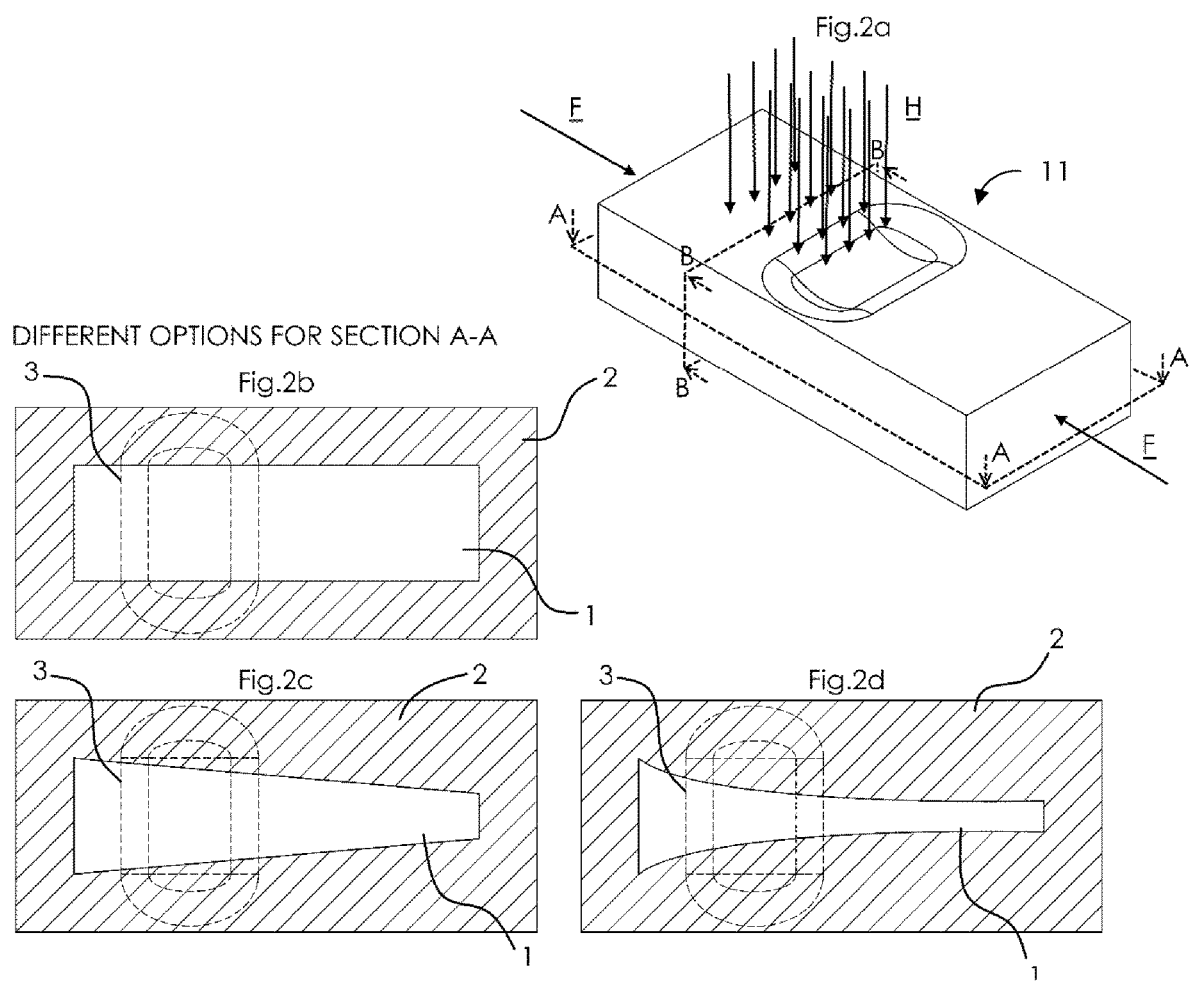

DIFFERENT OPTIONS FOR SECTION B-B

SECTION A-A

SECTION A-A

SECTION A-A

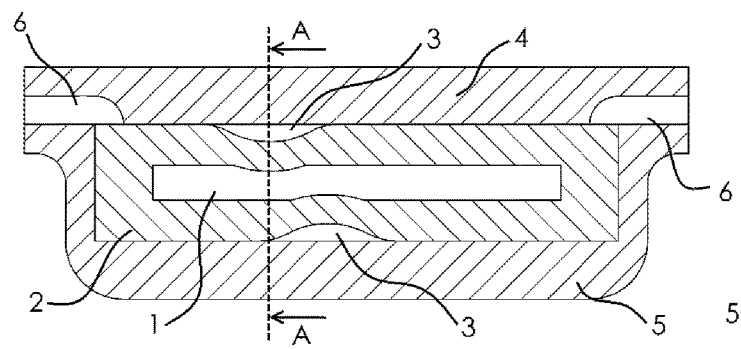
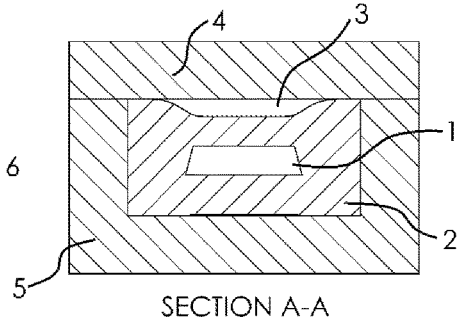
Fig.6a
Fig.6b
SECTION A-A
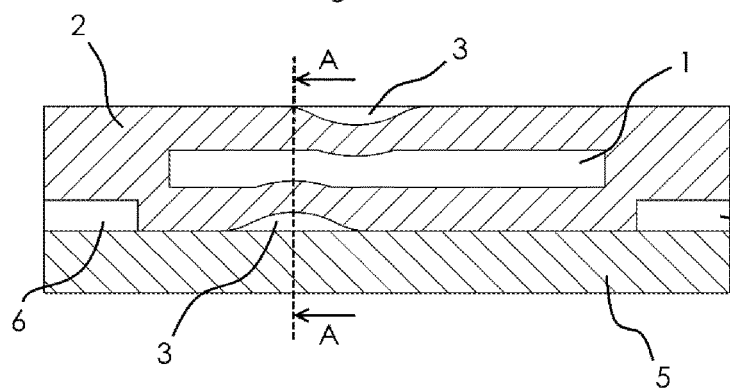
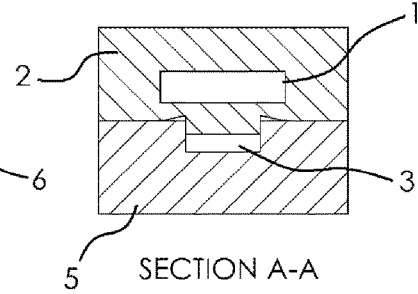
Fig.7a
Fig.7b
SECTION A-A

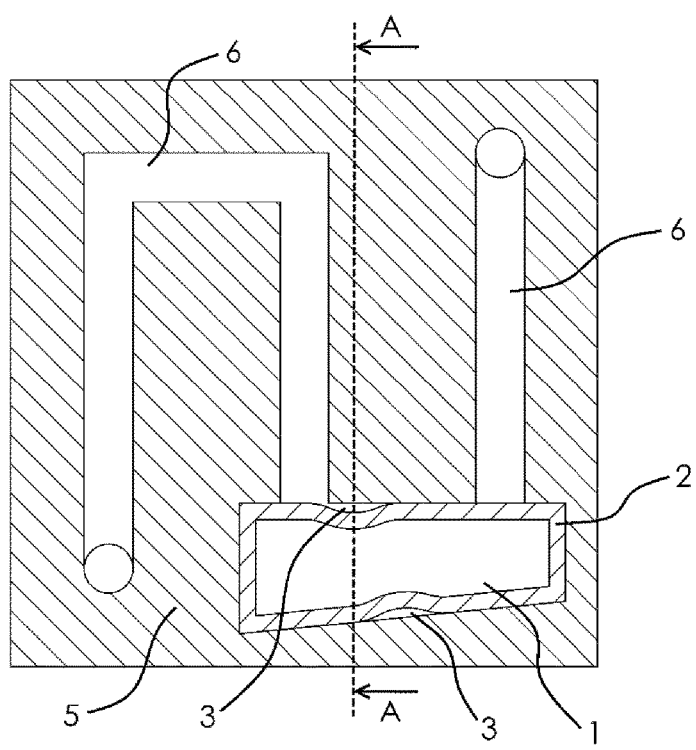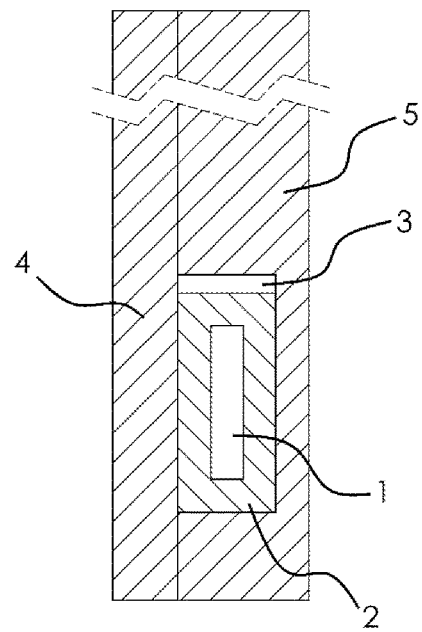
Fig.8a
Fig.8b
SECTION A-A
SCALE 2x

SECTION A-A

SECTION A-A

SECTION A-A

SECTION B - B

SECTION A - A

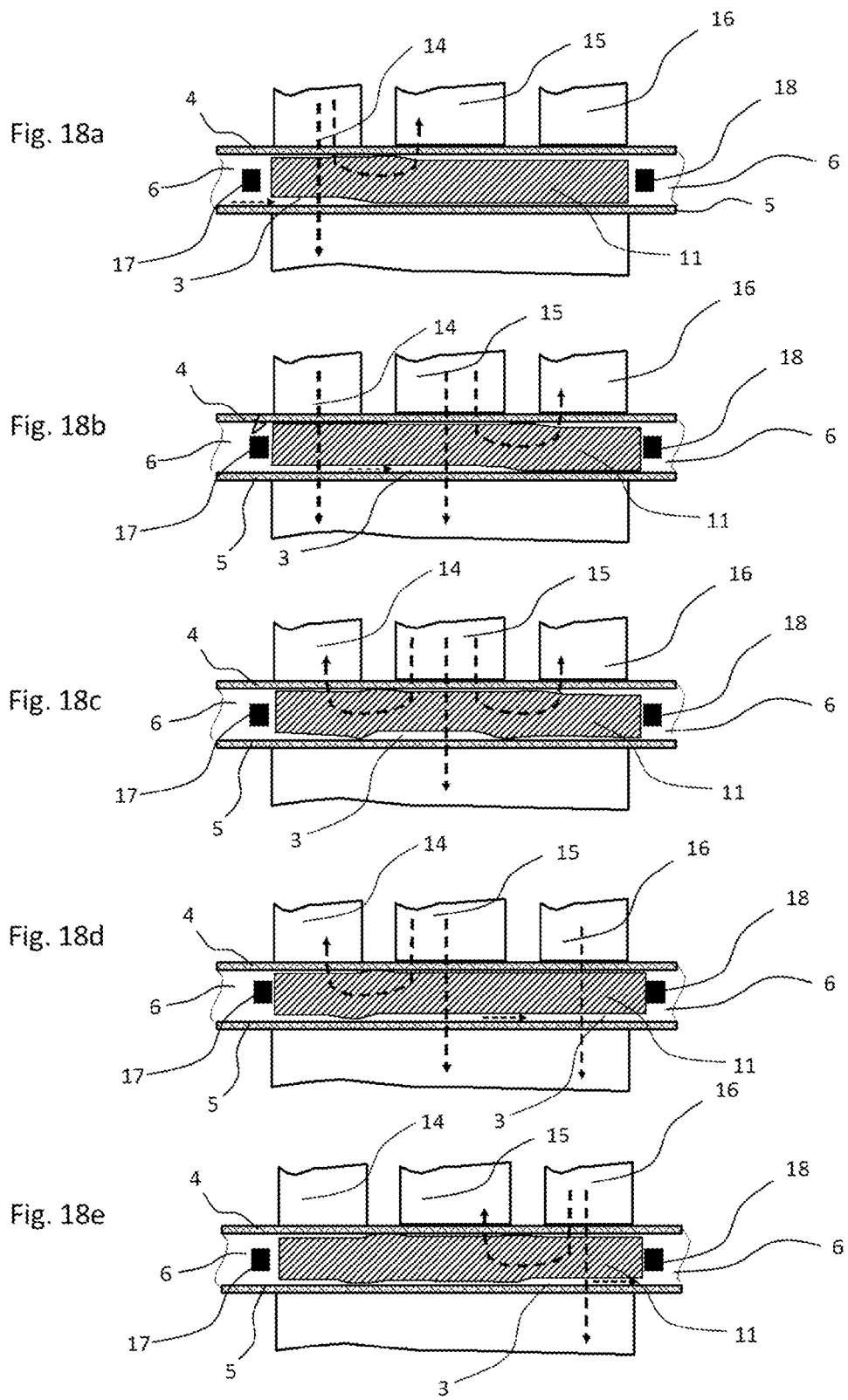

MICROFLUIDIC DEVICE

CROSS-REFERENCE TO RELATED APPLICATIONS

The present application is a National Stage application of and claims priority to PCT application PCT/FI2018/050537 filed Jul. 7, 2018 and titled The Microfluidic Device, which claims priority benefit to Finland Patent Application No. 20170102, filed on Jul. 7, 2017, and Finland Patent Application No. 20180036, filed on Mar. 8, 2018, the contents of the above applications are incorporated by reference herein in their entireties for all purposes.

FIELD OF THE INVENTION

The invention relates to a field of fluid control in micro devices such as lab-on-chips and chemical micro reactors. Point of care diagnostics is already nearly 40 billion dollars business and its annual growth is about 20%. However, development has been hindered by the lack of pumps and other fluid handling devices that can be integrated in the lab-on-chips. Currently, most of those components are separate apparatus placed outside the microfluidic chip. This invention relates to a fluid handling device such as a pump, compressor, dozer, valve, manifold or mixer that can be stand-alone devices or integrated in a microfluidic chip. The invention significantly simplifies microfluidic devices used, for instance, in biomedical, electronics and chemical applications.

BACKGROUND OF THE INVENTION

The field of microfluidics has developed rapidly in recent years due to the many advantages of handling fluids in small scale. Such advantages include reduced sample and reagent use, higher sensitivity, shorter processing times and precision dosing of nanoliter volumes. A driving force for this development is the sophistication of MEMS technology and their manufacturing methods. Important microfluidic markets are point-of-care diagnostics, biomedical research, lab-on-chip testing, chemical micro reactors and electronic component thermal management.

There has been significant research conducted to address the key challenge of fluid handling in microfluidics which has been identified as a microfluidic component that is relatively underdeveloped. Current research has been mainly focused on displacement micropumps utilizing piezoelectric drivers and dynamic micropumps, which make use of electrohydrodynamic or electro osmotic fluid transport. An ideal fluid handling solution should have the following characteristics: a) It should be robust and perform reliably. b) It should be simple with minimal external connections. c) It should minimize the overall device size. The aforementioned technologies each have their own shortcomings, such as insufficient pressure generation, passive check valves, high voltage requirements, dependency on fluid properties, or complicated design and manufacturing. Mechanical parts found in traditional pumping technologies, such as check valves and flexing diaphragms, significantly increase the complexity of the micropump and make it more difficult to integrate these pumping technologies into the lab-on-a-chip device.

The magnetic shape memory (MSM) alloy Ni—Mn—Ga has a variety of properties that make it a suitable material for microdevice fabrication. Through a process known as twinning, the crystallographic structure of the MSM alloy can be reoriented by converting energy from an applied magnetic field. Magnetic field of sufficient strength aligns the crystallographic easy axes c of the unit cells along the field direction thus increasing the fraction of those twin variants whose c axis are aligned in the field direction. The MSM material is capable of large (up to 10%) strains from magnetic-field-induced stress, the strain can be precisely controlled; and it has a short actuation time. A magnetic field applied to a part of the MSM element makes a local shrinkage in the element. The field can be generated by a permanent magnet. If the magnet is rotated around its symmetry axis the shrinkage travels along the element. Since this technology is actuated by a magnetic field, the device can be contact-free. Micropumps that carry fluid in a shrinkage of the MSM element formed by rotation of the permanent magnet are described in U.S. Pat. No. 9,091,251 B1 (July 2015) and publications Ullakko et al., Smart Mater. Struct. 21 (2012) 115020 (10pp), and Baker et al. Journal of Medical Devices, Vol. 10, December 2016, DOI: 10.1115/1.4034576. In present MSM micropumps, the MSM element is in contact with the pumped fluid. One disadvantage of the present pumps is that the surface of the MSM element can never be fully planar which is not good for sealing. Even if the surface of the austenitic MSM element was initially made planar and smooth, in martensite this surface is kinked because there is an angle of 3.5, 6 or about 10 degrees between different variants in 10 M, 14M or non-layered martensites, respectively. Kinking is illustrated in inset of FIG. 1. Second disadvantage of the present MSM pump solution is that the sharp line contact of the kink corner against the bottom plate of the pump results in local wearing and deformation of the element during pumping operation due to small translational motion of the surface of the MSM element. This results in blocking of the twin boundary motion that leads to gradual decrease of the pumping flow and ultimately causes cease of operation. Wearing is a major problem in long-term operation of the device. For proper operation of the pumps and for sufficient sealing, the contact surface should be smooth and the MSM element surface should not touch the bottom plate in order to prevent wearing and deformation. In present pump solutions, manufacturing of highly planar surfaces of the MSM elements with small tolerances is difficult and expensive.

SUMMARY OF THE INVENTION

The invention relates to fluid handling micro devices that can act as a micropump, compressor, dozer, valve, manifold or mixer, depending on the application. Microfluidic devices according to the invention may be a stand-alone apparatus or they may be integrated in lab-on-chips or other apparatus. Operation of those devices is based on magnetic-field-induced shape changes of the Magnetic Shape Memory (MSM) materials using a magnetic field sources placed outside the microfluidic device. Magnetic field source placed outside the microfluidic device may be a rotating permanent magnet system having at least two magnetic poles or an electromagnet composed of at least two coils powered successively, as schematically shown in FIG. 17. Electromagnetic powering makes it possible to utilize the ultrafast actuation in the devices according to the invention. In present MSM micropumps, electromagnetic actuation has not been used.

Essential feature of the invention is that the MSM element is embedded in an elastic material entirely, or at least one surface of the MSM element is separated from the fluid by suitable shape of the elastic material with a proper elastic constant. The elastic material acts as a sealing or it can also form the chamber or channels for fluid flows or be a part of those chambers or channels. Use of elastic material structures according to the invention makes the devices simple and easy to manufacture as compared to present designs.

The elastic material layer perfectly seals the device and prevents leakage of fluid flow and prevents it from passing to the other sides of the element. The elastic layer smoothens the kinked surface of the MSM material and can provide fully planar and smooth sealing surface. It also prevents abrasive wearing of the surface of the MSM element because the kink corners are not in direct contact with the bottom plate as shown in FIG. 1d. Elastic material layer has also an important role in controlling the shape of the shrinkage of the MSM element by keeping twins narrow, which is necessary for proper operation of the device. Elastic material prevents the fluid being in direct contact with the MSM element that is a Ni—Mn—Ga or Ni—Mn—Ga based alloy. In present MSM pumps, the fluids that may be a reactive chemical or contain living cells is in contact to the Ni—Mn—Ga element. For some substances, Ni—Mn—Ga is harmful. Elastic material on the MSM element may decrease the friction on the sealing surface that decreases the magnetic field strength required for operating the device. In some applications, the elastic material serves a spring force for recovering the strain of the MSM element. Elastic material also enables new features of the devices according to the invention, for instance, controlling pumping volume by pressing of the element against the bottom plate. Elastic material serves advantages in manufacturing: elastic layer is easy to make smooth or planar, for instance by casting or molding. As a result, requirements for the surface quality, or roughness and manufacturing tolerances for the MSM element can be reduced. Actually, it is advantageous for attaching of the elastic material that the surface of the MSM element is slightly rough. In addition, the use of elastic material enables manufacturing such device structures where the elastic material is in contact to the bottom plate on all its sides, as illustrated in FIG. 1. The sides can be even glued to the bottom plate. This makes the sealing fully hermetic.

Elastic material, for instance elastomer, separating at least one surface of the MSM element from the fluid makes the devices according to the invention ideal for integrating into lab-on-chip or point-of-care devices that are often made from polymeric materials such as elastic PDMS. Elastic material used for sealing of the pumping element may be an integral part of the lab-on-chip. In disposable lab-on-chips, the integrated fluid handling device must be simple and low cost. Due to fully hermetic sealing, the pump according to the invention generates high pressure, which makes it very suitable for transferring fluids in tiny micro channels of the microfluidic devices. Pressure produced by the device according to the invention was measured to be several bars that is over two orders of magnitude higher than pressure generated by the competing piezoelectric and dynamic micropumps. Devices according to the invention have no mechanical parts; the MSM element separated from the fluid by elastic material is the primary component that acts as the fluid controlling mechanism. Due to magnetic powering of the device, there are no electrical contacts in the fluidic device integrated in the lab-on-chip.

BRIEF DESCRIPTION OF THE DRAWINGS

FIG. 1a schematically shows a fluid handling element FHE 11. A magnetic field H is applied to a part of the element in substantially vertical direction creating a shrinkage in the FHE 11. Constraining or contracting force is marked as vector F. Cross sectional views A-A and B-B are shown in FIG. 1b and FIG. 1c, respectively. The FHE 11 is composed of the magnetic shape memory (MSM) element acting as actuating element, denoted by 1, made from a magnetic shape memory (MSM) material and an elastic material 2. The inset presented as FIG. 1d illustrates the twin structure in the region of the shrinkage. Black stripes are twin variants with the short crystallographic axis c aligned vertically and the white stripes are twin variants having the short c axis in horizontal direction. FIG. 1e shows the serrated surface of the MSM element 1 with kinks. The sharp kink corner is denoted by 13.

FIG. 2a schematically shows a fluid handling element FHE. FIGS. 2b-2j schematically shows different shapes of the MSM element 1 and the elastic material 2 of the FHE 11 taken along line A-A of FIG. 2a. FIG. 2b-c schematically show bottom views of the FHE's 11 containing selected shapes of the MSM elements 1 and FIG. 2e-j show examples of the cross sectional views of the FHE's 11. FIG. 2d shows a FHE having a cross section suitable for compressing liquids. The actuating element made from a magnetic shape memory (MSM) material is denoted by 1, and an elastomeric structure is denoted by 2 and the shrinkage is marked with 3.

FIG. 6a schematically shows a microfluidic device in which the FHE 11, composed of the magnetic shape memory element 1 embedded in an elastic material 2 and containing a shrinkage 3, is placed in the cavity of the bottom plate 5. The fluid channels 6 and other cavities are in the cover plate 4 of the device. FIG. 6b shows the cross section A-A of the device.

FIG. 7a schematically shows a detail of the microfluidic device with a bottom plate 5 containing a fluid channel 6, on which the FHE 11, composed of the magnetic shape memory element 1 embedded in elastic material 2 and containing a shrinkage 3, is placed. The MSM element 1 is situated above the surface of the bottom plate 5. The elastic material 2 fills the fluid channel in that length where the shrinkage travels. FIG. 7b shows the cross section A-A of the device.

FIG. 8a schematically shows a microfluidic device in which the FHE 11, composed of the magnetic shape memory element 1, embedded in elastic material 2 and containing a shrinkage 3, is placed in pocket of the bottom plate 5 that contains also fluid channels 6 and other cavities for fluid.

FIG. 8b shows the cross section A-A of the device. Cover plate attached to the bottom plate is denoted by 4. The active plane of the FHE 11 is substantially parallel to the plane of the plates 4 and 5. Thickness of the FHE 11 decreases towards right.

FIG. 18 schematically shows five stages during the operation cycle of a pump driven by an electromagnet. The five cycles are shown in FIG. 18a-e.

DETAILED DESCRIPTION OF THE INVENTION

Figure 2E:
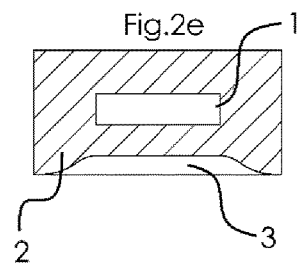

The invention relates to a fluid handling device that can act for example as a micropump, compressor, dozer, valve, manifold or mixer, depending on the application. Microfluidic device according to the invention may be a stand-alone device or it may be integrated in lab-on-chips or other apparatus. Essential feature of the invention is that the MSM element 1 is embedded in an elastic material 2 entirely, or at least one surface of the MSM element 1 is separated from the fluid by suitable shape of the elastic material 2 with a proper elastic constant. The surface of the MSM element 1 that is separated from the handled fluid by the elastic material 2 is defined as Active surface 12. The elastic material 2 is placed between its base and the active surface. Bottom plate 5 acts as a base.

The elastic material 2 acts as a sealing or it can also form the chamber or channels for fluid flows or be a part of those chambers or channels. Depending on the application, the elastic material 2 can be volume-compressible or non-volume-compressible. Volume compressible elastic material 2 may contain gas bubbles. The elastic material 2 containing the MSM element 1 is defined as Fluid Handling Element FHE 11. The FHE 11 contains at least one Magnetic Shape Memory (MSM) element 1 made for example from 10M or 14M martensitic Ni—Mn—Ga or Ni—Mn—Ga based alloys. Twin boundaries of the MSM element 1 may be of Type I or Type II. Advantage of Type II twin boundaries in 10M martensite is that they move at lower magnetic field strengths than Type I boundaries and the twinning stress is substantially temperature independent which means that the shrinkage volume remains unchanged if the temperature of the device changes.

FIG. 1a schematically shows an FHE 11 in which a local magnetic field H in vertical direction creates a shrinkage. MSM element 1 and elastic material 2 are shown in FIG. 1b and FIG. 1c, respectively. Shrinkage is denoted by 3 and a constraining or contracting force by F. Active plane is the plane determined by the direction of the short crystallographic axis c and the long axis a, and in which the easy magnetization axis changes direction by the external magnetic field. Three-dimensional Cartesian coordinate system was fixed in the MSM element 1 in such a way that the length is defined to be in X direction, width in Y direction and height in Z direction. Preferably the height (Z) is shorter than the width (Y), and preferably the width is shorter than length (X). The coordinate system is shown in FIG. 1. In FIG. 1, the active plane is plane A-A. Magnetic field H and force F lie in the active plane. Constraining force prevents the ends of the element from moving, and contracting force reduces the length of element. Longitudinal direction is defined as the direction perpendicular to plane B-B and vertical direction is defined as the direction perpendicular to plane A-A in FIG. 1a. The MSM element 1 is embedded in the elastic material 2 wholly or partially depending on the application. Thickness of the elastic material 2 is determined according to the application for fulfilling the requirements set for the FHE 11. Thickness can vary along the element.

Elastic material 2 is selected so that its elastic constant is optimal for the application, taking into account the thickness of the elastic material 2. If the elastic constant is too high and the layer too thick, the magnetic-field-induced strain of the MSM element 1 is not strong enough for creating a shrinkage. If the elastic constant is too low and the layer thickness too high, the shrinkage on the surface of the FHE 11 does not follow the shrinkage of the MSM element 1. FIG. 1b shows the cross sectional view (Section A-A) of the FHE 11. FIG. 1d shows the twin structure of the MSM element 1. Twin variants are denoted by parallel black and white stripes. The serrated surface of the MSM element 1 is shown in FIG. 1e. The sharp corner of the tilted surface of the MSM element 1 between the twin variants is denoted by 13. Elastic material 2 prevents abrasive wearing of the surface, especially deformation of the sharp kink corners 13 on the surface, of the MSM element 1 because the kink corners 13 are not in direct contact with the bottom plate. Surface deformation due to wearing would block the twin boundaries from moving that would decrease the mobility of the shrinkage and even cease operation of the device. FIG. 1c shows Section B-B of the FHE 11. Depth of the shrinkage decreases towards the sides of the FHE 11. It is emphasized that FIG. 1 shows is an example of the FHE 11. Shapes of the MSM element 1 and elastic material 2 can vary according to the application.

Making the attachment of the MSM element 1 to the elastic material 2 stronger, the surface of the MSM element 1 can be treated with a primer, or the surface of the MSM element 1 can be modified in such a way that the MSM element 1 is also mechanically attached to the elastic material 2. Such surface modifications may be cavities. MSM elements 1 may also contain holes or slits through the element for making bridges of the elastomer between both sides. The MSM element 1 may also be composed of at least two separate MSM elements 1. Having at least two narrow elements instead of one broad element is also beneficial for decreasing eddy current losses, magnetic-field-induced tilting of the MSM element 1 and also decreasing the risk of cracking: if one element cracks, there are still other elements working normally. The elastic material 2 is also a supporting substance that connects separate elements working together as one MSM element 1.

For the accuracy and repeatability of the fluid control, it is important that the shrinkage volume remains unchanged during operation. The shrinkage in the MSM element 1 is smoothly curved and the shape of the shrinkage cavity remains repeatable in operation only if the twin structure is fine, i.e., the twins are narrow. If the twins were broad, the shape of the shrinkage would be serrated, and the shrinkage volume would not be well controlled. This would lead to uncontrolled pumping characteristics and short fatigue life of the MSM element 1. Fine twin structure also prevents cracking of the elements and increases their fatigue life. The elastic material 2 attached to the MSM element 1 reduces the influence of kinking and decreases the width of the twins. The effect can be enhanced by shot peening at least one side of the MSM element 1 prior to attaching it in the elastic material 2. MSM elements 1 used in the devices shown in EXAMPLES 1 through 4 were shot peened by soda blasting. Soda blasted elements were not damaged even after a billion straining cycles, which is well above requirements set for the most microfluidic devices.

Figure 17:
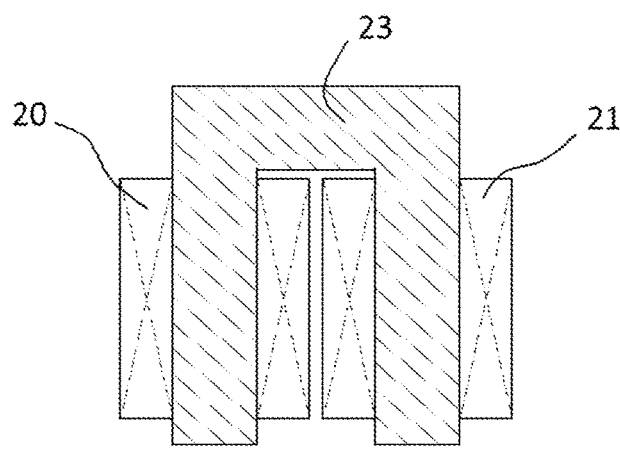
FIG. 17 schematically shows an electromagnet composing of a magnetic circuit 23 and two coils 20 and 21.

Magnetic field applied to the MSM element 1 of the device is generated using a magnetic field source that may be an electromagnet, a rotating permanent magnet system having at least two poles or translation of permanent magnets. A permanent magnet system can be composed of several permanent magnets that create more than two magnetic poles. Advantage of the multipole magnet system is that the magnetic field can be concentrated in a smaller area of the MSM element 1, smaller rotating speed can be used, and stray fields are lower. Lower stray fields reduce interference between other MSM pumps and other devices. The electromagnet may be placed at least on one side of the FHE 11. The electromagnet is composed of at least two coils 20, 21 that are powered successively, as schematically shown in FIG. 17. EXAMPLE 6 shows pumps, whose principle is similar to those shown in FIG. 4 and FIG. 5, powered by electromagnets containing three coils. EXAMPLES 1 through 3 below show embodiments of a pump that were powered using a rotating permanent magnet system having two magnetic poles and EXAMPLE 5 shows a manifold powered by an electromagnet and also by a rotating permanent magnet system. Using electromagnetic actuation, it is possible to take full advantage of the ultrahigh speed actuation of the MSM elements 1, which is not possible using a magnetic field source based on a rotating permanent magnet system. We have shown that the actuation velocity of the MSM element 1 can reach 5 m/s and acceleration a million m/s$^2$ when a short magnetic field pulse is applied to a small MSM element 1. Ultrahigh speed actuation of the devices according to the invention is expected to create several new applications in biomedical and chemical industries. For instance, devices according to the invention may shoot drugs through a cell wall or suck RNA from the cells.

Figure 2F:
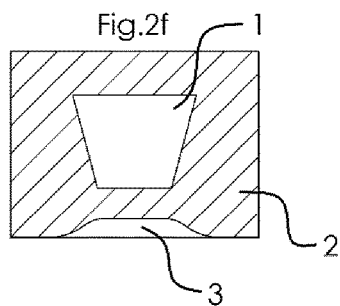
Figure 2G:
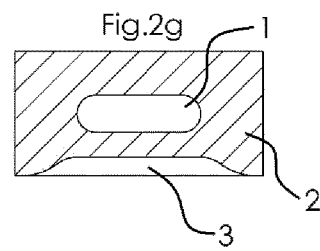
Figure 2H:
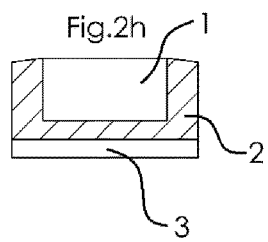
Figure 2I:
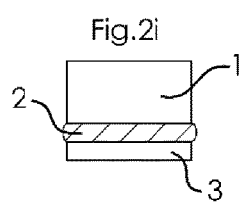
Figure 2J:
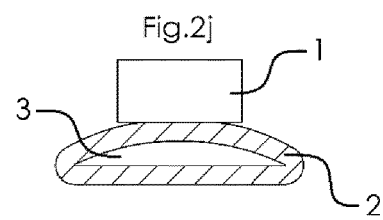

Shape of the fluid handling element FHE 11 is selected according to the application. Examples of the shapes are presented in FIG. 2. FIG. 2b-c schematically show bottom views of the FHE's 11 containing selected shapes of the MSM elements 1 and FIG. 2e-j show examples of the cross sectional views of the FHE's 11. FHE 11 having a cross section A-A as shown in FIG. 2a and cross section B-B as shown in FIG. 2e can be used for a pump, valve, dozer and manifold or mixer. FHE's 11 with cross sections A-A as shown in FIGS. 2c and 2d are suitable for compressing fluids, because the shrinkage volume decreases when the shrinkage moves along the FHE 11. Using an MSM element 1 according to Example 2d, compressing effect is higher in the upper part of the element and becomes gradually smaller when the shrinkage moves further. FIG. 2e illustrates an important feature of the invention that the elastic material 2 is wider than the MSM element 1 and makes the shrinkage curving down to the bottom plate on its sides. This fully prevents fluid flow to the back side of the FHE 11. Cross section of the MSM element 1 shown as FIG. 2f is beneficial in certain applications because it creates more gentle sloping of the shrinkage than the MSM element 1 shown in FIG. 2e. This is because the shrinkage gradually decreases towards the sides due to decreasing of the thickness of the MSM element 1 towards the sides. The cross sectional shape shown in FIG. 2f also concentrates magnetic flux lines, which may be utilized in certain applications. FHE's 11 with elliptic or circular cross sections exhibit no sharp corners which decrease local stresses in the elastic material 2 and also makes the shrinkage very smooth. Lack of corners in the MSM element 1 also increases the fatigue life of the element. FIGS. 2e-g present the examples where the elastic material 2 structures do not deform on sides because they are fixed to the surrounding surfaces. They may also be free on sides, but then the elastic material 2 slightly deforms also on its sides. The structures presented in FIG. 2 may also show a detail of a larger device. Example shown in FIG. 2h and FIG. 2i relate to a case in which the elastic material 2 follows the shape change of the MSM element 1 without curving in sides. FHE 11 shown in FIG. 2h contains an MSM element 1 that is covered with the elastic material 2 in all other sides except one side that is left uncovered. FIG. 2i shows a case where the elastomer material 2 is placed only on the active surface of the MSM element 1. FIG. 2j shows an FHE 11 in which the elastic material 2 is attached on one side of the MSM element 1. The cross section of this FHE 11 forms a flat loop. This type of FHE 11 is a peristaltic pump in which the shrinkage cavity carries the fluid. FHE 11 shown in FIG. 2j illustrates an important feature of the invention that the MSM element 1 combined with the properly designed elastic material 2 form a microfluidic device that can manipulate the fluid. It is emphasized that the FHE's 11 presented in FIG. 2 are selected examples only. The shapes can also differ from those examples, e.g., the MSM element 1 may be cut in such a way that the active surface 12 is curved and the corners of the MSM element 1 can be rounded.

Figure 3A:
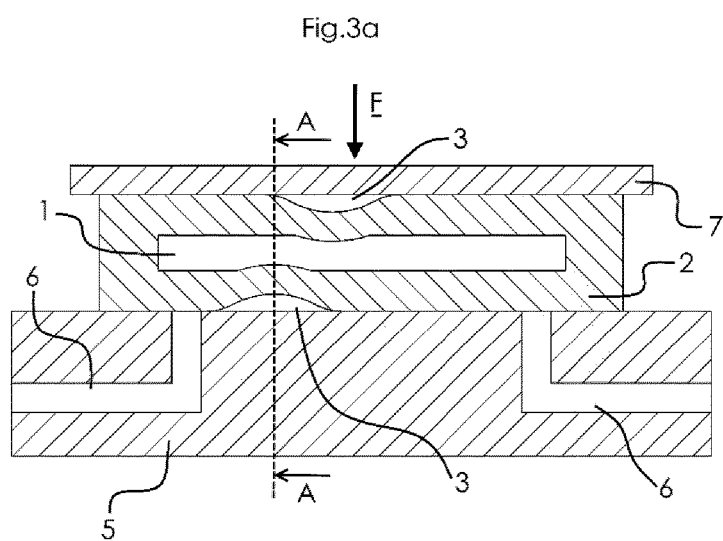
FIG. 3a schematically shows a cross sectional view of the microfluidic device in which the FHE 11 composed of the magnetic shape memory element 1 embedded in an elastic material 2 and containing a shrinkage 3 is attached on the inlet and outlet holes of the microfluidic channels 6. A solid cover plate 7 is pressed with force F.
Figure 3B:
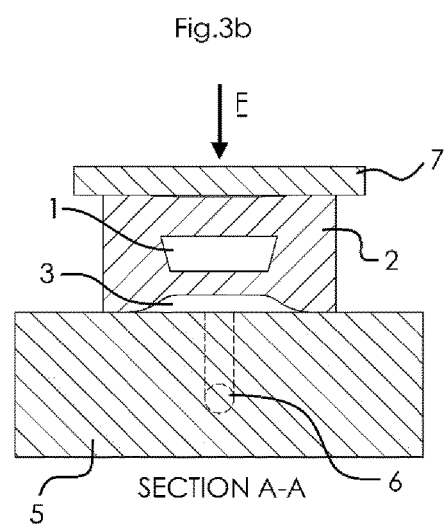
FIG. 3b shows the section A-A of the device.
Figure 4A:
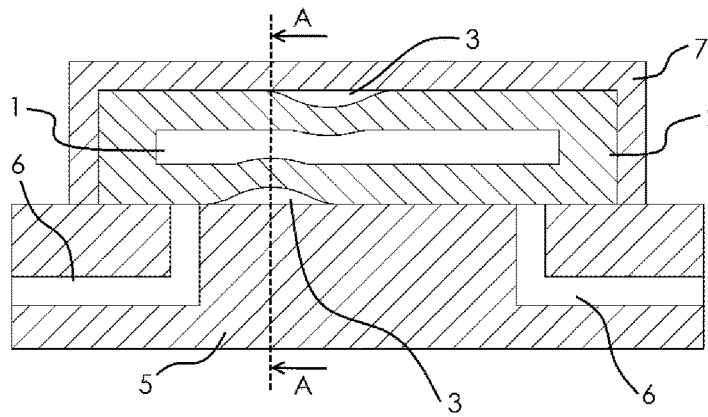
FIG. 4a schematically shows a microfluidic device in which the FHE 11, composed of the magnetic shape memory element 1 embedded in an elastic material 2 and containing a shrinkage 3, is placed in a casing 7 and attached on the inlet and outlet holes of the microfluidic channels 6. The bottom plate is denoted by 5.
Figure 4B:
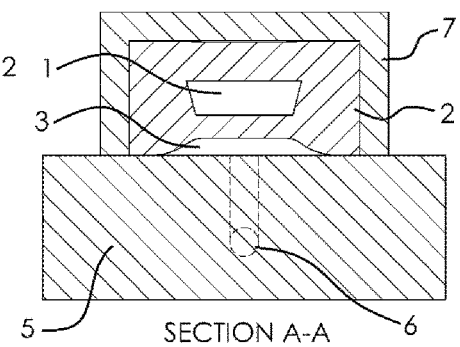
FIG. 4b shows the cross section A-A of the device.

The fluid handling element FHE 11, for instance, a pumping element can be placed on the inlet and outlet holes of the microfluidic channels 6 of the device, e.g., lab-on-a-chip or chemical micro reactor. Such an example is shown in FIG. 3. Pressing the cover plate 7 with force F decreases the shrinkage volume. Increasing force decreases the shrinkage volume even over two orders of magnitude. Example of this type of pump with controllable pumping flow is presented in EXAMPLE 3. Another illustration of a fluidic device that can be attached on the inlet and outlet holes of the fluid channels 6 is shown in FIG. 4. The FHE 11 is placed in a rigid housing 7 that is attached on the surface of the device 5. Housing 7 attached to the surface of the device 5 forms a rigid casing around the FHE 11. Rigidity of this casing ensures that shrinkage volume stays constant during running of the device. EXAMPLE 1 shows an embodiment of this type of pump. The rigid cover 4 may also be made from ferromagnetic material for preventing stray field of the magnetic field. This ferromagnetic material must have low eddy current losses. One such material is ferromagnetic ferrite, or a composite containing ferromagnetic powder.

Figure 5A:
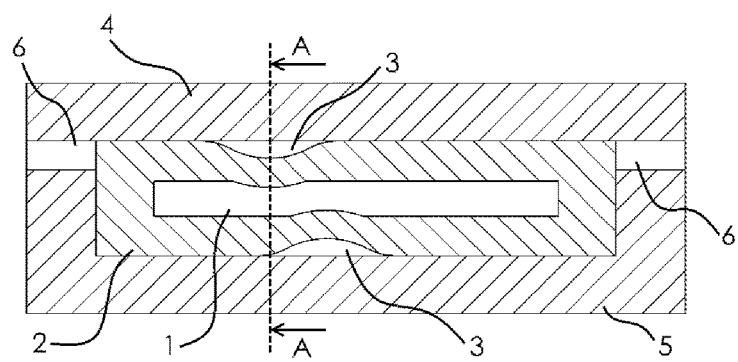
FIG. 5a schematically shows a microfluidic device in which the FHE 11, composed of the magnetic shape memory element 1 embedded in an elastic material 2 and containing a shrinkage 3, is placed in the cavity of the bottom plate 5. The fluid channels 6 and other cavities are in the bottom plate 5 of the device.
Figure 5B:
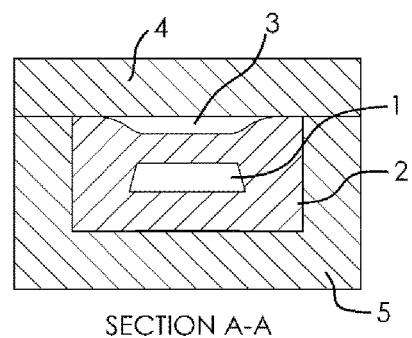
FIG. 5b shows the cross section A-A of the device.

FIG. 5 shows an example of the microfluidic device that contains a cover plate 4 and a bottom plate 5. The FHE 11 is placed in the pocket made in the bottom plate 5. Microfluidic channels 6 are made in the bottom plate. It is emphasized that FIG. 5 shows only that part of the device that contains the fluid handling device. The whole device may be, for instance, a lab-on-chip, chemical micro reactor, or like. FIG. 5 also shows cross sectional view A-A of the FHE 11 of the device. EXAMPLE 2 shows an embodiment of the pump shown in FIG. 5. FIG. 6 shows a microfluidic device in which the fluid channels 6 and other fluid cavities are made in the cover plate 4 of the device. This design is optimal when the cover plate 4 is made using roll to roll techniques for instance from PDMS polymers or like. The bottom plate 5, possibly made also by roll to roll techniques and incorporating the FHE's 11, are attached on the cover plate 4, e.g., by gluing, chemical processes, ultraviolet light or laser techniques. The cover 4 and bottom plates 5 incorporating fluid channels 6 and other cavities may also be fabricated using casting with molds, injection molding, hot embossing, milling, carving or by laser ablation. Fluid channels 6 and other cavities for fluids may also be made partially in the cover plate 4 and partially in the bottom plate 5. It is emphasized that the devices shown in all figures are presented just for illustrating selected features of the invention abut not limited to them. For instance, fluid channels 6 can be connected to the devices in different directions than shown in the Figures. Also, separate bottom and cover plates are not necessary in some devices according to the invention. Cover 7 shown in FIG. 4 may not need to be made from some rigid material, but it can be made from the elastomeric cover by hardening the surface of the elastomer chemically or using, for instance, ultraviolet light.

In many microfluidic devices, especially lab-on-chips, the microfluidic channels can be very tiny, just few micrometers in depth and width. Due to the small size of the channels, it is challenging to connect a micropump to those channels. FIG. 7 schematically shows one solution for a micropump that can be integrated in very small scale microfluidic devices. In FIG. 7, only those parts are shown that are essential for pumping. Other parts of the device like a cover plate are not shown in FIG. 7. The FHE 11 is placed on a micro channel in such a way that the elastic material 2 of the FHE 11 fills the cross section of the fluid channel 6, except in that part of the channel where the shrinkage 3 locates. The MSM element 1 is situated above the channel. Therefore, the MSM element 1 can be much larger in width than the microfluidic channel, which makes manufacturing easier, tolerances larger and costs lower. Filling the fluid channel with the elastic material 2 of the FHE 11 may be performed in several ways, e.g., by casting, molding or pressing the elastomer in the channel by external force during the operation of the device. EXAMPLE 3 shows an embodiment of the invention, in which an initially flat elastic material 2 of the FHE 11 is pressed with such high vertical force against an open microfluidic channel that the elastic material 2 locally fills the channel. By increasing the force, shrinkage of the MSM element 1 decreases, leading to smaller pumping flow. Results showed that pumping flow can be controlled for over two orders of magnitude by the applied force. Experiments were made with a constant pumping frequency. Also, stability and repeatability of the pumping flow was proven excellent.

Lab-on-chips are usually thin plates. In some devices according the invention, the active plane of the FHE 11 is parallel to the plate of the lab-on-chip, i.e., the dimension of the FHE 11 can be high in the plane direction but small in the direction perpendicular to the plane of the plate. For instance, if the dimension of the FHE 11 perpendicular to the plane is 0.2 mm and parallel to the plane the dimension may be 2 mm. Advantage is that the depth of the shrinkage is large because the shrinkage is located in the thin side of the FHE 11 that is perpendicular to the plane of the lab-on-a-chip. FIG. 8a illustrates a lab-on-a-chip where the active plane of the FHE 11 is parallel to the chip plane. The FHE 11 is placed in the pocket of the bottom plate 5. Fluid channels 6 and other cavities for fluids are in made in the bottom plate 5. Cover plate 4 seals the FHE 11 and fluid channels 6. Side view section B-B (FIG. 8b) shows that the FHE 11 is wedge-shaped in this example device. It is emphasized that also other shapes than a tapered FHE 11 can also be used as an example). Pressure of the fluid increases if the fluid is pumped from left to right. This example of a microfluidic chip is a compressor. This case shows that compressing can also be performed with an FHE 11 whose thickness decreases along the element. FIG. 2 showed examples of a fluid compressing FHE's 11 with a variable width. Largest compressing effect occurs in the FHE 11 in which both width and thickness decrease along the FHE 11.

Figure 9A:
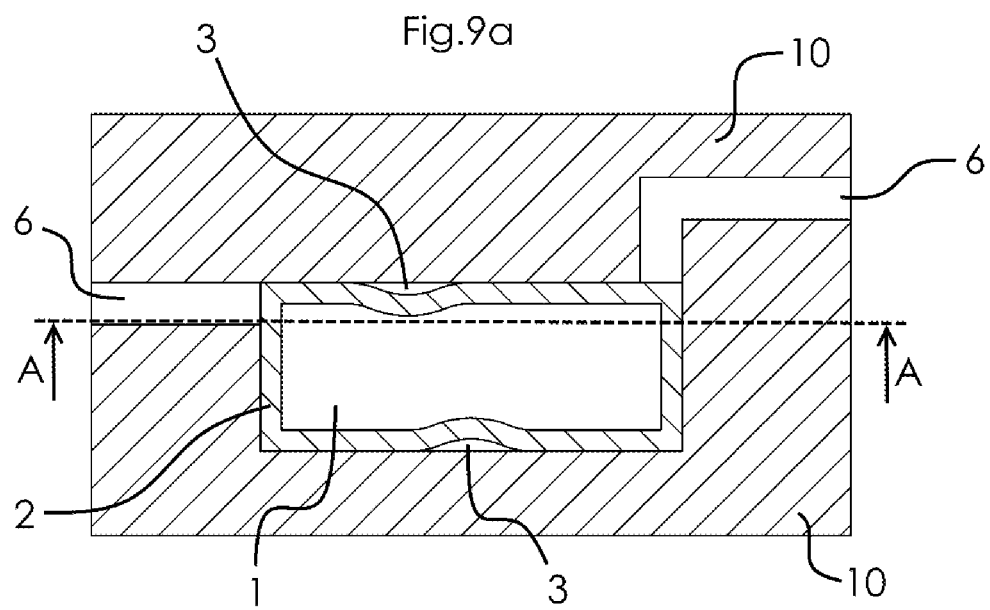
FIG. 9a schematically shows a microfluidic device in which the FHE 11, composed of the magnetic shape memory element 1 embedded in elastic material 2 and containing a shrinkage 3, is placed in a hole of the middle plate 10 that contains also fluid channels 6 and other cavities for fluid.
Figure 9B:
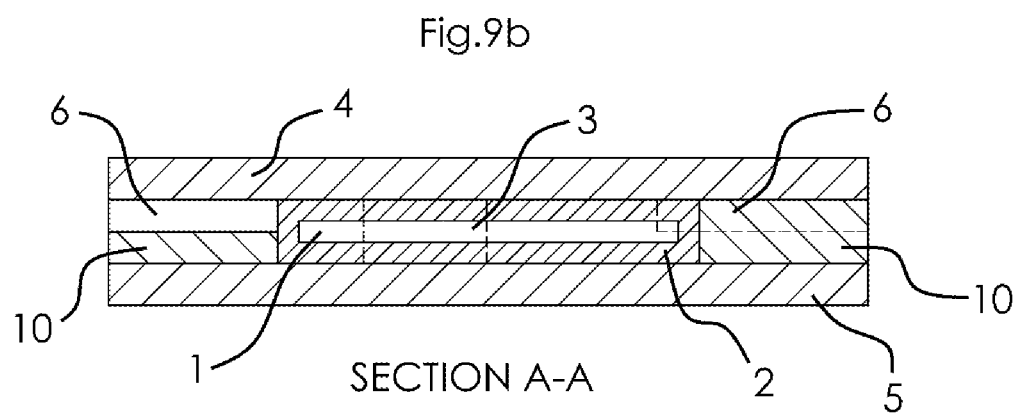
FIG. 9b shows the cross section A-A of the device. Cover plate attached to the bottom plate is denoted by 4 and bottom plate by 5. The active plane of the FHE 11 is substantially parallel to the plane of the plates 4, 5 and 10.

FIG. 9 schematically shows a microfluidic device in which the FHE 11 is placed in a hole of the middle plate 10 that incorporates also fluid channels 6 and other cavities required for the device. Cover plate attached to the bottom plate is denoted by 4. The active plane of the FHE 11 is substantially parallel to the plane of the plates 4 and 5. This embodiment is suitable for being manufactured using roll-to-roll techniques. The middle layer may be PDMS elastomer and the cover plates, for example, acryl.

Figure 10A:
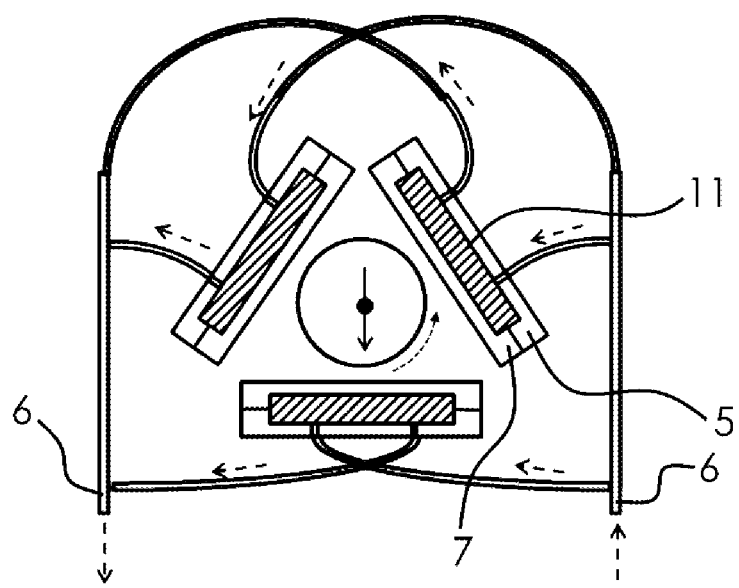
FIG. 10a schematically shows a microfluidic device composed three pumps containing the magnetic shape memory element 1 and the elastic material 2 driven with a rotating permanent magnet system. The fluid channels 6 are connected in parallel.
Figure 10B:
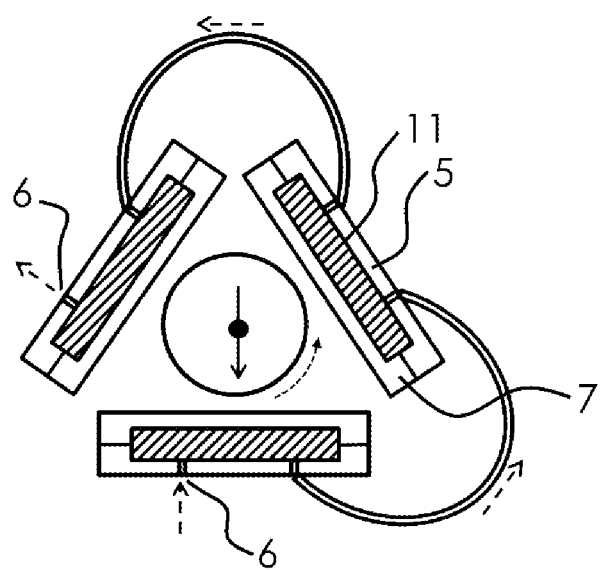
FIG. 10b schematically shows a microfluidic device composed three pumps containing the magnetic shape memory element 1 and the elastic material 2 driven with a rotating permanent magnet system. The fluid channels 6 are connected in series.

Characteristic feature of the micropumps according to the invention is that the flow is pulsating. One pumping cycle transfers one shrinkage volume of fluid. Flow pulses can be smoothened using a reservoir in the fluid channel. Micropumps may also utilize shrinkages located on both sides of the FHE's 11 for pumping. However, shrinkage is smaller in that side of the MSM element 1 that is faced the magnet due to magnetostatics force that pulls the element. Pulses can also be decreased by at least two micropumps working in parallel in different pumping phases. FIG. 10*a* shows an example of the pumping system composed of three pumps, composed of the FCE 11, cover plate 4, bottom plate 5 and fluid channels 6, that are placed in the circle around the rotating permanent magnet system. The fluid channels 6 are connected in parallel. Number of pumps connected in parallel can be two, three or more for further smoothening of the flow. Alternatively, it is possible to use a set of at least two parallel pumps placed in (or on) the same plate, and each pump having its own angle shifted permanent magnet system rotating in the same axis. If the previously described pumps are connected in series, then pressure of the fluid is multiplied and pressure in the outlet has lower variation. FIG. 10*b* shown an example where three pumps are connected in series.

Figure 11A:
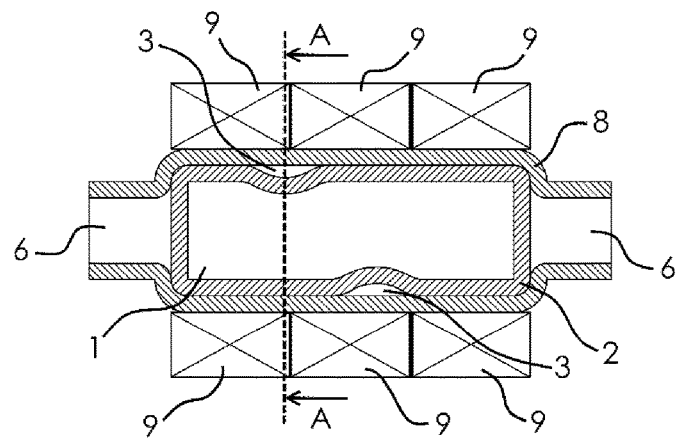
FIG. 11a schematically shows a microfluidic device in which the FHE 11, composed of the magnetic shape memory element 1 covered with elastic material 2 and containing a shrinkage 3, is placed in a substantially cylinder symmetric cover 8. The figure also illustrates an embodiment of the invention for actuating the FHE 11 using three coaxial coils 9 that may be powered successively.
Figure 11B:
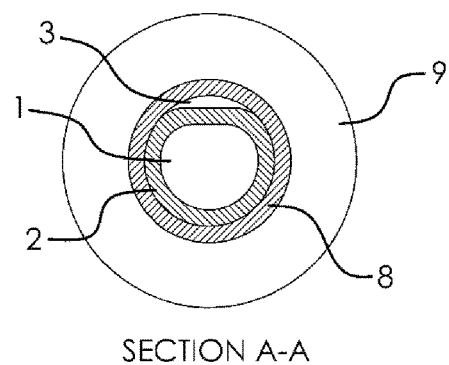
FIG. 11b shows the cross section A-A of the device.

Devices according to the invention may also be axial symmetric as schematically shown in FIG. 11. A cylindrical FHE 11 is placed inside a substantially cylinder symmetrical cover 8. The MSM element 1 may be actuated using an electromagnet or a rotating permanent magnet system. The electromagnet may contain three coaxial coils 9 that are powered successively, as illustrated in FIG. 11. Because electromagnetic actuation fast current pulses can be ultrafast, the device can shoot the fluid out from the device at a very high speed. Dosing of small quantities of drugs or chemicals at high accuracy is expected to be an important group of applications for this device. The device can also suck fluids at high acceleration and speed, which may be utilized, for instance, in sucking the contents of biological cells.

Figure 12A:
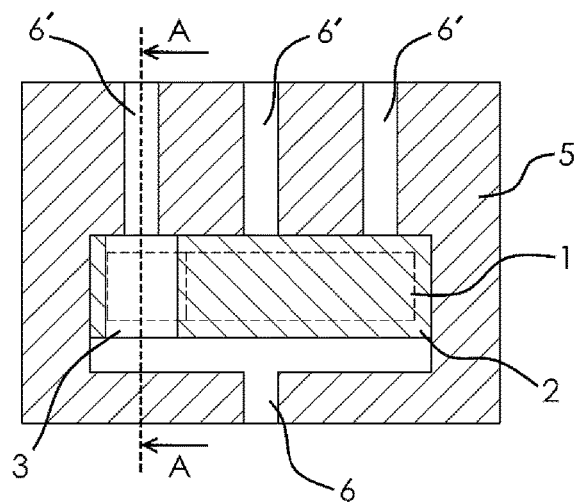
FIG. 12a schematically shows a microfluidic device that is a manifold. The FHE 11 is composed of the magnetic shape memory element 1 embedded in elastic material 2. The shrinkage is denoted by 3. The inlet fluid channel is marked with 6 and the outlet channels with 6'. Bottom plate of the device is denoted by 5 and the cover plate by 4.
Figure 12B:
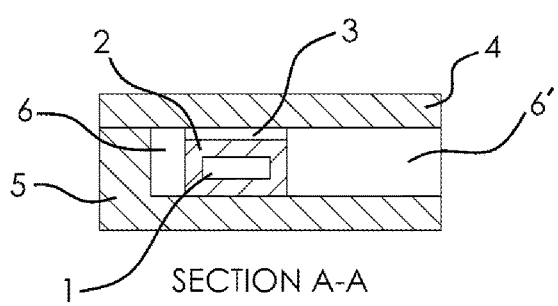
FIG. 12b shows the cross section A-A of the device.

A fluid handling element FHE 11 similar as used for pumping, may also be used in a manifold, as illustrated in FIG. 12. In the case of manifold, fluid flows through the shrinkage 3 across the FHE 11. On one side of the FHE 11 there is the inlet of the fluid 6 and on the other side of the FHE 11 there are at least two outlet channels 6'. When the shrinkage is placed in front of one outlet channel 6', the fluid flows from the inlet channel 6 to that outlet channel 6'. If the shrinkage is placed outside any of the outlet channels 6', the device acts as a closed valve. Using electromagnetic actuation and taking into account ultrafast motion of the shrinkages in the FHE 11, the manifold according to the invention may switch fluid flows from one outlet channel 6' to another within even in a microsecond. Electromagnetic actuation makes it possible to open and close the channels in any order, and two or more channels can be open also at the same time. Switching is not only on/off but switching can also be made gradually by moving the shrinkage partially in front of an outlet channel 6'. Manifolds according to the invention as assumed to have a great application potential in several fields of industry, such as biomedical, chemistry, micro robotics and micro manipulation. An embodiment of a manifold is presented below in EXAMPLE 5.

Devices according to the invention have several applications especially in biomedical, chemical and electronics industries. They are precise even for pumping or dosing of very small volumes of fluids. This feature, combined with ultrafast dosing speed, is of great importance, e.g., for neuro and molecular biological applications. These micropumps are not in contact with the fluids which is a necessary feature in many biological and chemical applications. The pumps transfer fluids in both directions and can act also as valves for closing and opening the flow channel. Pumps can also act as vacuum pumps. There is a need for miniature vacuum pumps in the market. Due to the simple structure, low cost and wireless magnetic field induced actuation, the integrated micropumps are an ideal solution for low cost disposable lab-on-chips. Pumps, valves, manifolds and mixers serve a solution for variety of lab-on-chip or chemical applications. Several gases and liquids can be handled using these devices. The pumps are suitable also for transferring liquids for cooling electronics components such as microprocessors. Using the compressor according to the invention, also micro refrigerators can be made. These refrigerators exhibit a great commercial potential for biomedical applications as well as in electronics, for instance, in processor cooling.

Example 1: Micropump Attached on a Microfluidic Chip, e.g., Lab-On-a-Chip

Figure 13A:
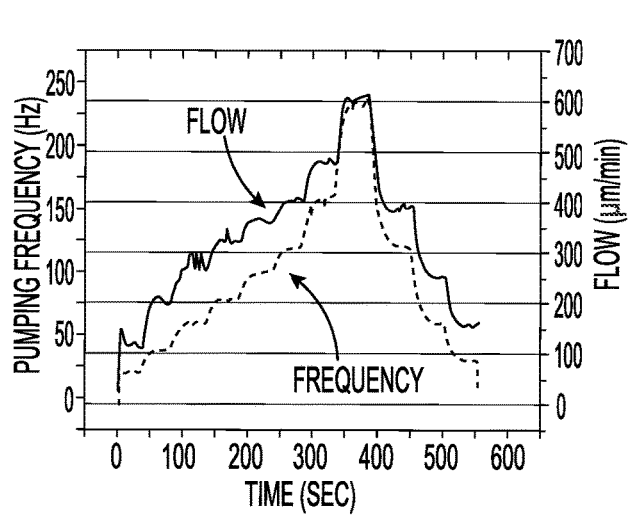
FIG. 13a shows pumping frequency and flow as a function of time. Upper curve in FIG. 13b shows pressure while water was pumped in a closed chamber containing air. The lower curve in FIG. 13b shows the flow measured simultaneously with pressure.
Figure 13B:
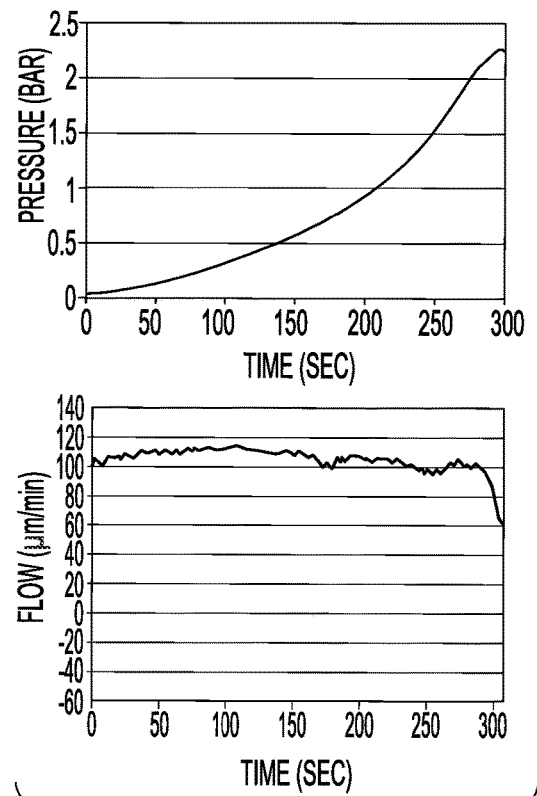
FIG. 13 shows pumping characteristics of a test pump.

A micropump whose principle was schematically shown in FIG. 4 was made and tested using water as a pumped fluid. Bottom plate 5 containing the fluid channels 6 was manufactured from acryl. The FHE 11, containing a Ni—Mn—Ga MSM element 1, with a thickness of 1 mm, width 2 mm and length of 8 mm, was embedded in an elastic material 2 and covered with a rigid plastic cover 7. The MSM element 1 was soda blasted prior to embedding it in the elastic material 2 for making thin twin structure and, consequently, a smoothly curved shrinkage in the element. The rigid cover containing the FHE 11 was attached on the bottom plate 5 on the inlet and outlet holes of the fluid channels 6 whose cross section was 200×400 µm2. A permanent magnet system having two magnetic poles with a diameter of 6 mm was rotated beneath the bottom plate 5. FIG. 13*a* shows pumping frequency (which is twice that of the rotating frequency of the magnet due to two poles of the magnet) and flow as a function of time. Frequency was increased step-wise from 0 to 250 Hz, and after that decreased back to zero. Figure shows that the flow increases with steps up to 600 mL/min and decreases after that to zero. The results show that flow can be precisely controlled by the pumping frequency. The pump was shown to be self-priming and pumping in both directions. FIG. 13*b* reveals results of an experiment in which water was pumped in a closed chamber containing air. Upper curve shows pressure increasing gradually up to 2.2 bars. During pumping against increasing pressure, flow remains constant up to 2 bars. Sealing of the pump limits the pressure to 2.2 bars. With better sealing, the pumps according to the invention might pump even close to 30 bars which is the limit set for the maximal magnetic-field-induced stress of the Ni—Mn—Ga material. In some experiments, we reached pressure of bars. For microfluidic applications, it is of great importance that the pump is able to reach high pressures and flow does not depend of the pressure. Micropumps according to the invention generate higher pressures than many competing pumps. The test pump was shown to create low pressures. Air was pumped out from a test chamber, and a pressure less than one millibar was reached. This experiment reveals that the pumps according to the invention are also small-size vacuum pumps. Using good sealing, the pumps are expected to reach pressures well below one millibar.

Example 2: Pump Integrated Inside a Chip

Figure 14:
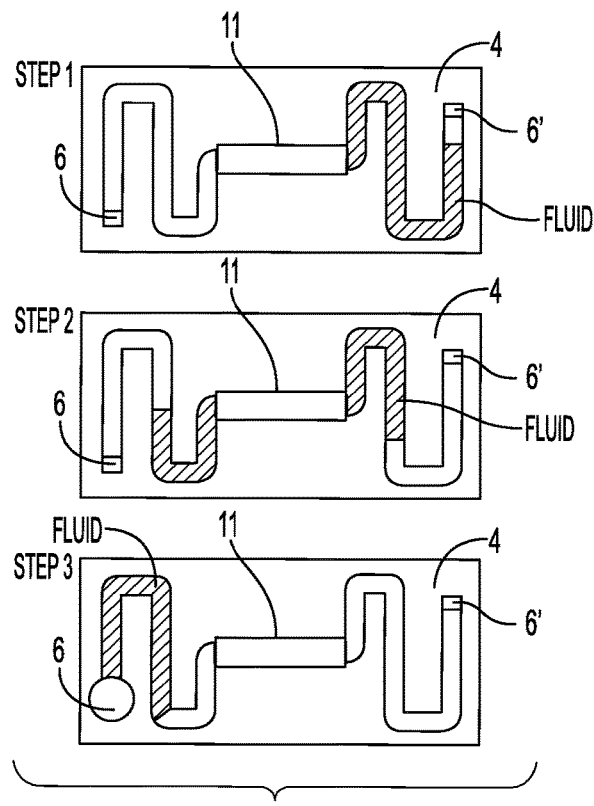
FIG. 14 shows snapshots of three pumping steps of a test pump. Snapshots show a part of the chips restricted with dashed rectangles. Fluid channels are noted by 6 (inlet) and 6' (outlet). The FHE's 11 are the black areas in the middle of the chips. Colored water droplet was initially placed on the opening of the inlet channel 6. Steps 1, 2 and 3 show the snapshots taken at 10, 20 and 40 seconds after starting pumping, respectively.

A micropump like schematically shown in FIG. 5 was made from acryl. The chip contained microfluidic channels with a height of 250 μm and width of 2 mm. Dimensions of the Ni—Mn—Ga MSM element were 500 μm (thickness), 1 mm (width) and 8 mm (length). The element was soda blasted prior to embedding it in the elastic material 2. The volume of the shrinkage in the FHE 11 was measured to be about 20 nL. Pumping frequency was 100 Hz and flow was 2 nL/s. FIG. 14 shows snapshot photos of three pumping steps taken through the acrylic cover plate 4 of the chip. Snapshots show a part of the chips restricted with dashed rectangles. Fluid channels are noted by 6 (inlet) and 6' (outlet). The FHE's 11 are the black areas in the middle of the chips. Colored water droplet was initially placed on the opening of the inlet channel 6. Steps 1, 2 and 3 show the snapshots taken at 10, 20 and 40 seconds after starting pumping, respectively. The pump was shown to be self-priming and bi-directional e.g., being able to pump in both directions.

Example 3: Micropump Placed on a Microfluidic Channel

Figure 15A:
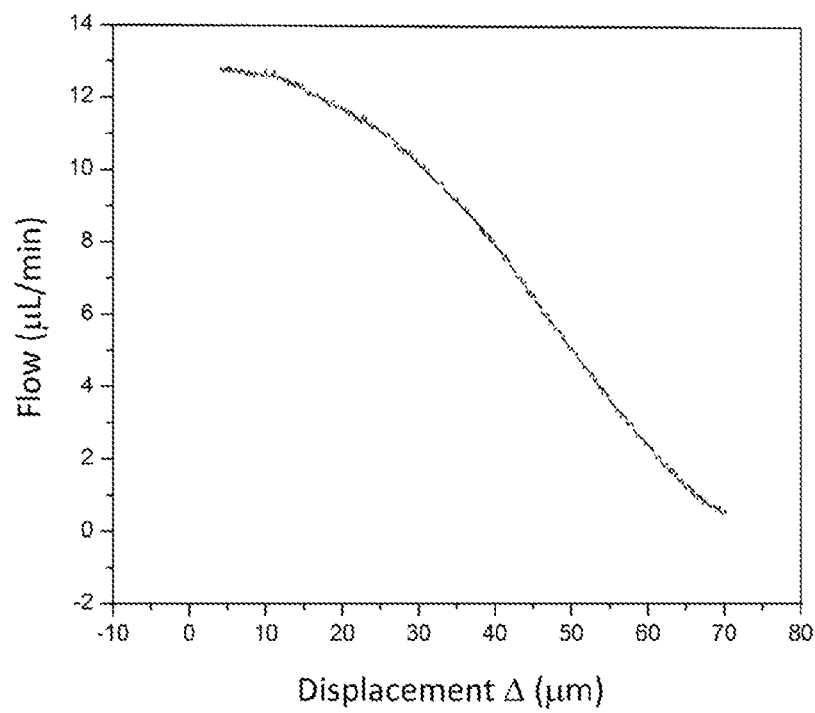
FIG. 15 shows the dependence of the flow of water as a function of the pressing force F.

A micropump whose principle was presented in FIG. 7 was made and its performance was tested. The pump that is an MSM element 1 with dimensions of 1 mm (thickness)×2 mm (width) and 8 mm (length) embedded in the middle of an elastomeric plate whose height was 3 mm, width 10 mm and length 15 mm. The top and bottom surfaces (width× length) of the elastomeric plate were planar and smooth. This plate corresponds to the elastic material denoted by 2 in FIG. 7. A steel cover plate was placed on the elastomeric plate. The cover plate was pressed with different forces and the distance (A) between the cover plate and the bottom plate, denoted by 5 in FIG. 7 was measured simultaneously. Pump operated with a frequency of 60 Hz. Pumping flow was measured using a flow meter as a function of distance A. FIG. 15a shows the pumping flow vs. A. Prior to this experiment, the elastomeric material 2 was pressed for filling the fluid channel. FIG. 15a show that flow decreased from 12 μL to about 400 nL when the cover plate moved 70 μm. Flow decreases with decreasing force because the force reduces the shrinkage volume of the FHE 11. Results reveal that pumping flow can be controlled in a large range by external force. Advantages of the micropump according to the invention are the controllability of the flow in a large range by force applying to the cover plate and capability of pumping very small volumes using quite large-size MSM elements 1. Large MSM elements 1 are easier to manufacture in reasonable tolerance than very tine elements.

Figure 15B:
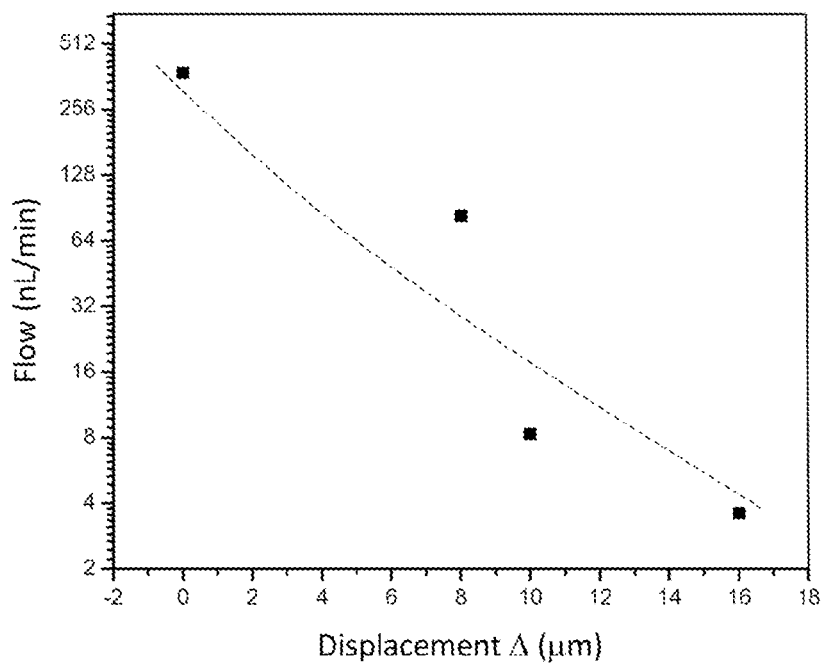

Cover plate was continued to press with increasing force. Because pumping flow was beyond the resolution of the flow meter, optical detection by following optically the motion of the flow was used for measuring the flow. FIG. 15b shows pumping flow detected optically as a function of displacement A. FIG. 15b shows that flow continues to decrease from about 400 nL/min to 4 nL/min when the displacement increases from 70 μm to 86 μm. The micropump according to the invention has outstanding pumping characteristics: flow varied between 12 mL to 4 nL, which is over three orders of magnitude. If, in addition, the pumping frequency would have decreased from 60 Hz to 0.6 Hz, the flow could be varied over five orders of magnitude.

Optical detection is one method for detecting the flows in the micropumps according to the invention. This information may be used for controlling the flow. One possibility is to detect some objects that move along with the flow using machine vision.

Example 4: Pumping Flows with Small Elements

For pumping extremely small volumes of fluids, different sizes of small MSM elements 1 were made and their pumping characteristics were studied. Table below shows the dimensions of the element (thickness×width×length), pumping volume/cycle that is the same as a shrinkage volume of the FHE 11, and pumping flow at a test frequency of 100 Hz. The results reveal that the pumps according to the invention are suitable for accurately pumping and dosing drugs in very small quantities.

| Dimensions of MSM element | Pumping volume/ cycle | Pumping flow at 100 Hz |
|---|---|---|
| 2.5 × 1 × 8 mm$^3$ | 130 nL | 800 μL/min |
| 1.4 × 1 × 8 mm$^3$ | 10 nL | 60 μL/min |
| 0.45 × 0.45 × 8 mm$^3$ | 2 nL | 10 μL/min |
| 0.45 × 0.45 × 8 mm$^3$ | 0.6 nL | 3 μL/min |

Example 5: Manifold

Figure 16A:
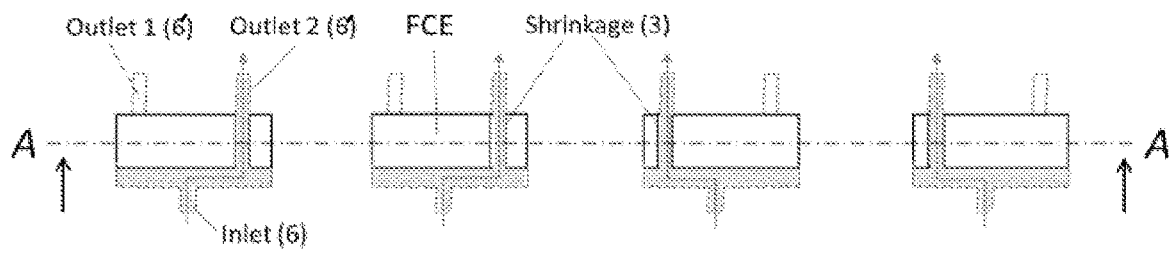
FIG. 16 shows snapshots representing four steps of operation of a manifold. The flow paths for each step are shown. SECTION A-A shows the cross sectional views of the device for all steps. Steps 1 and 2 present the case when water flows from inlet channel 6 to Outlet-2 6'. Between Step 2 and Step 3, shrinkage 3 was moved from the location of Outlet-2 6' to the location of Outlet-1 6' by applying a local magnetic field on that section of the MSM element 1 that is beneath the Outlet-1 6' channel.
Figure 16B:
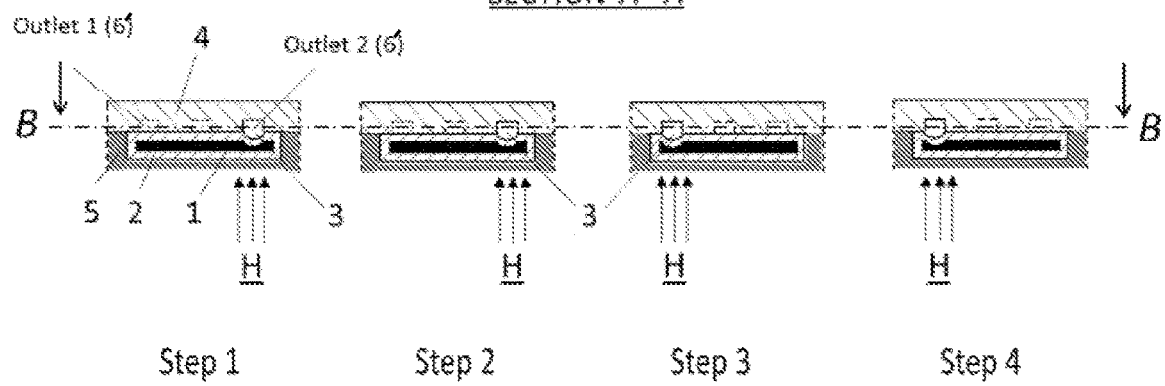

A manifold with one inlet channel 6 and two outlet channels 6' was made and its performance was tested. The manifold was made from two acryl plates: a bottom plate 5 in which a pocket was milled for the FHE 11 and a cover plate 4 that contained the fluid channels (6 for inlet channel and 6' for two outlets) with the width of 500 μm and depth 200 μm. Cover plate 4 was attached on the bottom plate 5. Colored water was pumped through the manifold. FIG. 16a shows snapshots representing four steps of operation. In FIG. 16a, the flow paths for each of the Steps 1 through 4 are shown. SECTION A-A shows the cross sectional views of the device for all steps. Steps 1 and 2 present the case when water flows from inlet channel 6 to Outlet-2 6'. Between Step 2 and Step 3, shrinkage 3 was moved from the location of Outlet-2 6' to the location of Outlet-1 6' by applying a local magnetic field on that section of the MSM element 1 that is beneath the Outlet-1 channel 6'. Simultaneously, the shrinkage disappears from the location of Outlet-2 6' because the MSM element 1 is constrained at its ends that keeps the fraction of the two twin variants constant. Steps 3 and 4 represent the case when water flows from Inlet channel to Outlet-1 6'. The flow path is visualized by an arrow from Inlet 6 to Outlets 6'. Both outlet channels 6' may be closed at the same time if the shrinkage is set between Outlet-1 6' and Outlet-2 6'. The manifold was powered using an electromagnet and a rotating permanent magnet system having two magnetic poles. Also sliding a permanent magnet beneath the FHE 11 was shown to move the shrinkage along the FHE 11 and switching the flow between the outlets.

It is emphasized that all examples shown in the text are used for illustrating some features of the invention, and the invention is not limited to those examples only.

Example 6: Devices Driven Using Electromagnets

A multiphase-coiled magnetic system (MMS) was designed and manufactured for moving the shrinkage cavity 3 of the devices according to the invention. In this design, the MMS is placed above the microfluidic device, as schematically shown in FIGS. 18a-18e. There are two possible operation modes of this type of devices. In the first operating mode, the magnetic handling element (MHE) located between the bottom plate 5 and cover plate 4 is not constrained at its ends. In the second mode, the elongation in the long direction of the FHE 11 is restricted by the rigid or elastic (e.g., spring) limiters 17 and 18. The elastic material 2 covering the MSM element 1 fully or partially may also provide the required spring force.

First Operating Mode:

The first operation mode with free FHE 11 is presented in FIGS. 18a-18e for the three-phase MMS. Three magnetic cores 14, 15 and 16 create three different magnetic fields by their own windings. For a multiphase case, core 15 can split on additional phase parts. The pump containing FHE 11 is located under the three parts of the magnetic cores (14-16). Limiters 17 and 18 are placed so that they allow free strain of the FHE 11.

Operation Cycle Contains the Following Stages:

At first, as shown in FIG. 18a, the magnetic field produced by the core 14 is directed downwards. Vertical component of the field creates the shrinkage cavity in the inlet part of the FHE 11 and opens the inlet. Due to the magnetostatics stress, the shrinkage cavity 3 in the upper side of the FHE 11 has a smaller volume than the cavity 3 in the lower side of the FHE 11. At the same time, the longitudinal component, that is aligned along the long dimension of the FHE 11, of the field creates partial contraction of the FHE 11 in the region between cores 14 and 15. Because of this, the flow channel between cores 14 and 15 is closed.

FIG. 18b presents the situation when the magnetic field produced by core 15 is added. The vertical component of this field starts to elongate part of the FHE 11 and increases the shrinkage volume 3 under the core 15. The fluid channel 6 between cores 14 and 15 open because the longitudinal component of the magnetic field in this region disappears, and the regions under cores 14 and 15 and the region between them will be subjected to vertical component of the field only. At the same time, longitudinal component of the field creates the contraction in the FHE 11 in the region between cores 15 and 16. Therefore, the channel between cores 15 and 16 will be closed. At this stage, the pump sucks from the inlet channel because the volume of the channel between cores 14 and 16 increases.

In FIG. 18c, the previous stage is finished and magnetic field of the core 14 is removed. The vertical component of the magnetic field produced by core 15 keeps the central chamber under core 15 open and the longitudinal component closes the channels between cores 14 and 15. The chamber under core 15 is filled by the fluid.

In FIG. 18d, the previous stage is continued by adding the magnetic field of the core 16. Therefore, the FHE 11 in the region under cores 15 and 16 and between them is subjected to the vertical field only. The chamber between cores 15 and 16 open and the fluid can flow in the channel under core 16.

In FIG. 18e, the magnetic field of the core 15 is removed. Therefore, the channel between cores 15 and 16 are closed by the longitudinal component of the field produced by core 17. The total volume of the channel under core 17 will be reduced and liquid flows out and the new operation cycle can start.

Second Operating Mode:

The second operating mode differs for the first mode in such a way that in the second mode, the elongation limiters 18 placed at both sides of the FHE 11 keep the length of the FHE 11 unchanged during operation. The main advantage of the second mode is that the volume changes in the channel are higher as compared to the changes in the first mode. Therefore, the pumping flow and the pumping pressure can be higher. However, the second operation mode requires stronger magnetic field that results in higher losses in the coils of the magnetic circuit which heats up the coils. The reason for higher field requirement is the double force needed for elongating the FHE 11 during the active magnetic phase and for contracting the FHE 11 during the passive phases.

Figure 19A:
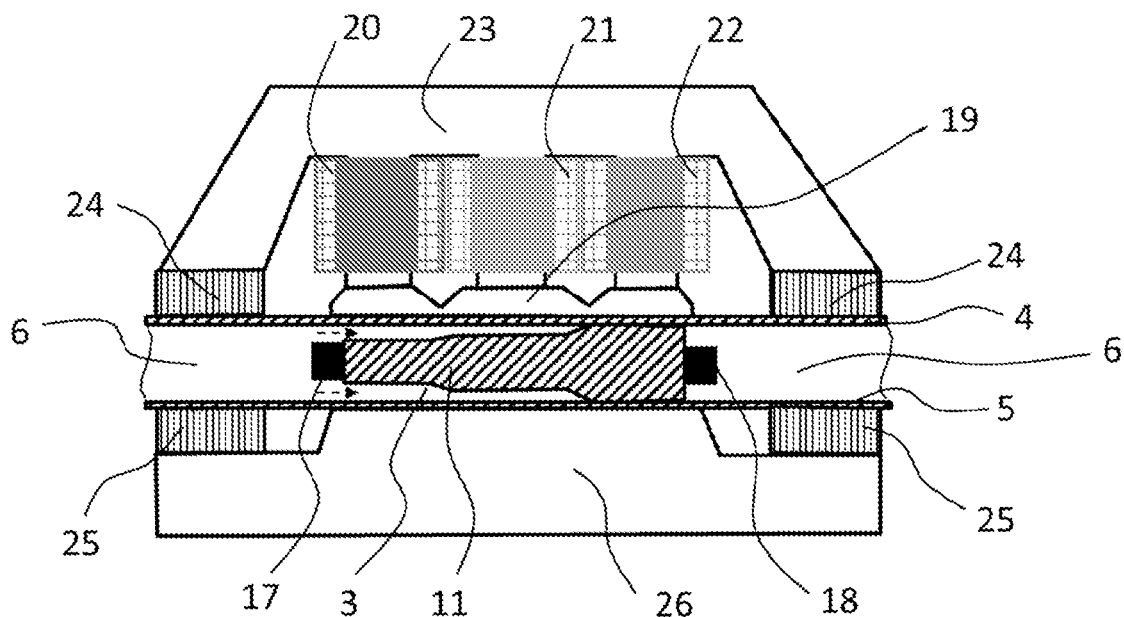
FIG. 19a and FIG. 19b schematically show two embodiments of pumps powered by an electromagnet containing three coils 14-16, which are driven in three phases.

Based on the operation principle of the device described above, several embodiments can be made. In FIG. 19, two embodiments of the pump are presented. In FIG. 19a, the pump design similar to as schematically shown in FIG. 5. The FHE 11 is placed inside a fluid chamber composed of the bottom plate 5 and cover plate 4. The chamber must be non-magnetic. The construction contains limiters 17 and 18, upper magnetic circuit 23 with three phase-coils 20, 21 and 22, lower passive magnetic circuit 26, and biasing permanent magnets 24 and 25. Depending on the application, the number of the magnets can variate, from two magnets to several magnets. The performance of the device can be improved by changing the magnetic field distribution inside the FHE 11 by using specially shaped ferromagnetic part 19. Purpose of this part is to widen the magnetic flux applying to the FHE 11. Biasing permanent magnets 24 and 25 also reduce the magnetomotive force of the coils and losses in them. This design is suitable for may applications, e.g., lab-on-chips, because the gap between the two parts of the magnetic circuit 23 and 26 are separate.

Figure 19B:
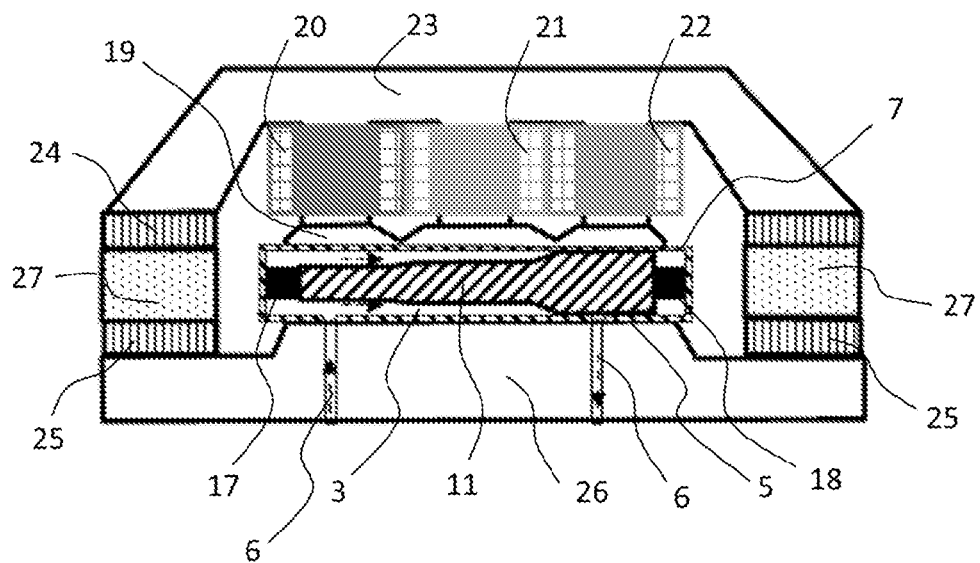

FIG. 19b shows a device in which the fluid channels 6 are placed in the bottom piece of the device 5, and the FHE 11 is covered with cover part 7. One embodiment of this type of design is schematically shown in FIG. 4. In the device shown in FIG. 19b, the fluid channels 6 have to pass through the lower magnetic field path 26. Alternatively, the fluid channels could be led from the sides of the device between the upper and lower magnetic circuit parts. Spacers 27 can be placed between the upper magnetic circuit part 23 and the lower magnetic circuit part 26. Depending on application, the spacers can be magnetic or non-magnetic.

Figure 19C:
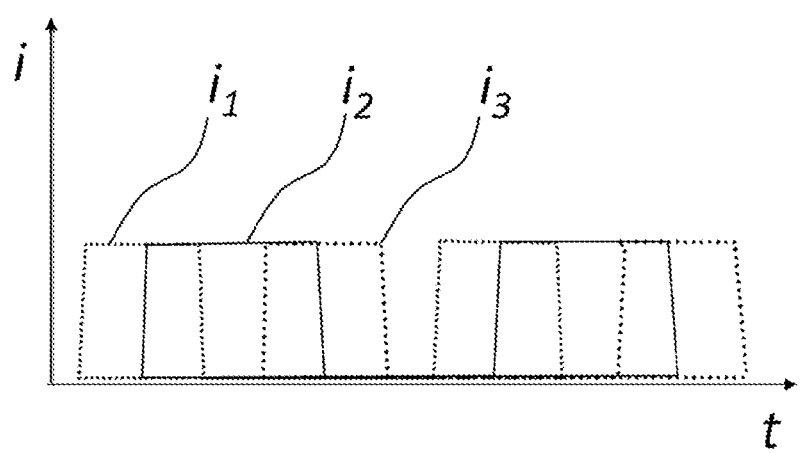
FIG. 19c shows the corresponding timing diagram of the phase-currents $i_1$, $i_2$ and $i_3$.

FIG. 19c shows the time diagram of the phase-coil currents $i_1$, $i_2$ and $i_3$. Currents $i_1$, $i_2$ and $i_3$ refer to the currents of coils 20, 21 and 22, respectively.

Two magnetic circuits 23 containing the coils 20, 21 and 22 may also be placed opposite to each other. The microfluidic device according to the invention is placed in the gap between the magnetic circuits. In this embodiment, the field strength in the gap is higher than using only one magnetic circuit with coils. Current in the coils can be smaller, and their heating is reduced. Permanent bias magnets are not required.

The pumps described above were made and their performance was tested by pumping water and air. The pumps were shown to be able to transfer fluids in a large range of frequencies. Electromagnets described above were also successfully tested in manifolds.

It is obvious to the person skilled in the art that the invention is not restricted to the examples described above but that it may be varied within the scope of the claims presented below.

It is also obvious to the person skilled in the art that the figures do not necessarily always show an entire device or apparatus, but they can show only a selected part of it. It is also obvious that figures are not necessarily in a scale, and that it is possible to connect examples and embodiments presented in different figures in different ways.

The invention claimed is:

1. Microfluidic device comprising at least one element of magnetic shape memory (MSM) material for handling of a fluid flow, the MSM element being controlled by a magnetic field, wherein the device comprises elastic material between the handled fluid and the MSM element, and the MSM element comprises at least one active surface to which the elastic material is attached, and that the magnetic field is arranged to form a local shrinkage to the MSM element which together with the elastic material form a shrinkage cavity in a location where the magnetic field is applied to the MSM element.

2. Microfluidic device according to claim 1, wherein the elastic material is glued to the at least one active surface of the MSM element.

3. Microfluidic device according to claim 1, wherein the MSM element is embedded at least partially in the elastic material.

4. Microfluidic device according to claim 1, wherein the elastic material is arranged to isolate the MSM element from the handled fluid.

5. Microfluidic device according to claim 1, wherein the MSM element has a length (X), a width (Y) and a height (Z), where the height (Z) is shorter than the width (Y), and the width (Y) is shorter than the length (X), and that the magnetic field is arranged to move the shrinkage cavity in the lengthwise direction of the MSM element.

6. Microfluidic device according to claim 1, wherein the MSM element consists of two or more substantially parallel parts that are arranged in the lengthwise direction of the MSM element.

7. Microfluidic device according to claim 1, wherein the MSM element comprises counter formations to improve mechanical bond between the MSM element and the elastic material.

8. Microfluidic device according to claim 7, wherein the counter formations are voids, pores, cavities, holes or recesses in one or more surfaces of the MSM element or gaps between parallel parts of MSM element.

9. Microfluidic device according to claim 1, wherein the MSM element and the elastic material together are arranged to form a fluid handling element FHE to be placed to a base of a fluid handling device to act as an actuator for handling fluid flows.

10. Microfluidic device according to claim 9, wherein the active surface comprises sharp corners, and that the elastic material is arranged to protect the corners from wearing by isolating the corners from the base.

11. Microfluidic device according to claim 1, wherein the length of the shrinkage cavity in the width (Y) direction of the MSM element is shorter than the longest dimension of the elastic material in the transversal direction of the MSM element.

12. Microfluidic device according to claim 11, wherein a layer of the elastic material is placed between a base and the MSM element and arranged to embed the shrinkage cavity between the MSM element and the base.

13. Microfluidic device according to claim 1, wherein the shrinkage cavity extends through the elastic material in the width (Y) direction of the MSM element.

14. Microfluidic device according to claim 1, wherein the cross-sectional dimensions and shapes of the MSM element in the width (Y) direction of the MSM element are arranged to formulate cross-sectional dimensions and shapes of the shrinkage cavity in the width (Y) direction of the MSM element.

15. Microfluidic device according to claim 14, wherein the cross-sectional shape of the MSM element in the width (Y) direction of the MSM element is one of the following: a rectangle, a rectangle with rounded or chamfered corners, an ellipse, a circle, a partially flattened circle, an isosceles trapezoid where the base side closer to the handled fluid is shorter than the base side that is further from the handled fluid.

16. Microfluidic device according to claim 12, wherein the elastic material fixed with its outer surface to the MSM element is arranged to form a channel for the handled fluid.

17. Microfluidic device according to claim 1, wherein the size and shape of the cross section of the MSM element in the width (Y) direction and/or height (Z) direction of the MSM element is substantially the same through the whole lengthwise length of the MSM element.

18. Microfluidic device according to claim 1, wherein the size and/or the shape of the cross section of the MSM element in the width (Y) direction and/or in the height (Z) direction of the MSM element varies through the whole lengthwise length of the MSM element.

19. Microfluidic device according to claim 1, wherein the shape of the cross section of the MSM element in the width (Y) direction of the MSM element is the same through the whole longitudinal length of the MSM element but the width in the width (Y) direction of the MSM element is arranged to decrease linearly from first end of the MSM element to the second end of the MSM element.

20. Microfluidic device according to claim 1, wherein the shape of the cross section of the MSM element in the width (Y) direction of the MSM element is the same through the whole longitudinal length of the MSM element but the width in the width (Y) direction of the MSM element is arranged to decrease curvilinearly from first end of the MSM element to the second end of the MSM element.

21. Microfluidic device according to claim 9, wherein the elastic material of the fluid handling element FHE between the MSM element and the handled fluid is placed on inlet and outlet holes of the microfluidic channels of a fluid handling device so that in a lengthwise direction of the MSM element a first end of the MSM element is upon an inlet hole of a microfluidic channel and a second end of the MSM element is upon an outlet hole of a microfluidic channel of the fluid handling device.

22. Microfluidic device according to claim 21, wherein the fluid handling element FHE is secured to its place with a cover element that is arranged to press the fluid handling element FHE against a base of the fluid handling device with a predetermined force F.

23. Microfluidic device according to claim 22, wherein the fluid handling element FHE is secured to its place with a cover element that is arranged to retain the fluid handling element FHE against the base with a constant force F.

24. Microfluidic device according to claim 9, wherein the fluid handling element FHE is encapsulated between the base forming a bottom plate, and a cover plate of the fluid handling device in an arrangement where microfluidic channels are made in the bottom plate.

25. Microfluidic device according to claim 9, the fluid handling element FHE is encapsulated between the base forming a bottom plate, and a cover plate of the fluid handling device in an arrangement where microfluidic channels are made in the cover plate.

26. Microfluidic device according to claim 9, wherein the fluid handling element FHE is placed on a microfluidic channel in the base in such a way that the elastic material of the FHE fills the cross section of the microfluidic channel) except in that a part of the microfluidic channel where the shrinkage cavity locates, and that the width of the MSM element in the transversal direction of the MSM element is larger than the width of the microfluidic channel.

27. Microfluidic device according to claim 9, wherein the fluid handling element FHE is placed on the base of fluid handling device, such as a lab-on-a-chip, in a position where an active plane of the FHE is substantially parallel to the width (Y) direction or the transverse direction of the MSM element) and to a plane of the base.

28. Microfluidic device according to claim 27, wherein the fluid handling element FHE is placed in a pocket of the bottom plate of fluid handling device, and that microfluidic channels and other cavities are in the bottom plate, and that the cover plate is arranged to seal fluid handling element FHE and the microfluidic channels.

29. Microfluidic device according to claim 24, wherein the fluid handling element FHE is placed in a hole of a middle plate between the base and the cover plate, which middle plate also incorporates microfluidic channels and substantially other cavities required for the fluid handling device.

30. Microfluidic device according to claim 9, the fluid handling element FHE is cylindrical with a round or ellipsoidal cross-section and covered with a tubular cover element, which fluid handling element FHE is joined to a microfluidic channels at its both ends.

31. Microfluidic device according to claim 9, wherein at least one magnetic field source is placed at least on one side of the device for creating a shrinkage cavity in the fluid handling element FHE.

32. Microfluidic device according to claim 31, wherein the magnetic field source is a permanent magnet system containing at least two magnetic poles.

33. Microfluidic device according to claim 31, wherein the magnetic field source is a permanent magnet system containing at least four magnetic poles.

34. Microfluidic device according to claim 32, wherein the shrinkage cavity is moved to a new location in the fluid handling element FHE by the influence of the rotation of the permanent magnet system.

35. Microfluidic device according to claim 32, wherein the shrinkage cavity is moved to a new location in the fluid handling element FHE by the influence of the translation of the permanent magnet system.

36. Microfluidic device according to claim 32, wherein the magnetic field source is an electromagnet composed of at least two coils.

37. Microfluidic device according to claim 35, wherein the magnetic field source is an electromagnet composed of at least three coils.

38. Microfluidic device according to claim 35, wherein the magnetic field is applied to the MSM element substantially perpendicular to the lengthwise direction (X) of the MSM element.

39. Microfluidic device according to claim 35, wherein the magnetic field is applied to the MSM element substantially parallel to the lengthwise direction (X).

40. Microfluidic device according to claim 38, further comprising a magnetic circuit which contains shaped ferromagnetic parts for widening the magnetic flux applying to the MSM element.

41. Microfluidic device according to claim 40, wherein the magnetic circuit contain at least two permanent bias magnets.

42. Microfluidic device according to claim 36, wherein the coils are magnetized with electric phase-shifted currents led to each coil successively.

43. Microfluidic device according to claim 36, wherein the coils of any number are magnetized with electric current pulses led to each coil in any order.

44. Microfluidic device according to claim 36, wherein the coils of any number are magnetized with electric current pulses led to at least two coils substantially at the same time.

45. Microfluidic device according to claim 1, wherein the MSM element is made from Ni—Mn—Ga alloy.

46. Microfluidic device according to claim 1, wherein the MSM element comprises a Ni—Mn—Ga-based alloy.

47. Microfluidic device according to claim 1, wherein a twin structure of the MSM element is one of the following: Type I twins in 10M martensite, Type II twins in 10M martensite, Type I twins in 14M martensite, or Type II twins in 14M martensite.

48. Microfluidic device according to claim 1, wherein the elastic material is an elastomer.

49. Microfluidic device according to claim 48, wherein the elastic material is PDMS polymer.

50. Microfluidic device according to claim 1, wherein the MSM element is shot peened at least on one of its surfaces prior to embedding in the elastic material.

51. Microfluidic device according to claim 21, wherein pulses of a pump are smoothened by connecting the inlet and outlet of the microfluidic channels of least two pumps in parallel.

52. Microfluidic device according to claim 51, wherein the pressure generated by the pump is increased by connecting the inlet and outlet of the microfluidic channels of least two pumps in series.

53. Microfluidic device according to claim 23, wherein the cover element of the device is ferromagnetic for preventing magnetic stray field from spreading outside the device.

54. Microfluidic device according to claim 1, wherein the device is connected to a lab-on-a-chip.

55. Microfluidic device according to claim 1, wherein the device is a part of structure made by roll-to-roll technique.

56. Microfluidic device according to claim 1, wherein the device is one of the followings: pump, vacuum pump, compressor, refrigerator, valve, manifold, dozer, or mixer.

* * * * *